United States Patent [19]

Halpern

[11] Patent Number: 5,734,722
[45] Date of Patent: Mar. 31, 1998

[54] ELECTRONIC TRAVEL PASS

[76] Inventor: John Wolfgang Halpern, 21 Second Avenue #5, Hove, United Kingdom, BN3 2LN

[21] Appl. No.: 182,097

[22] PCT Filed: Jul. 16, 1992

[86] PCT No.: PCT/GB92/01309

§ 371 Date: Jul. 13, 1994

§ 102(e) Date: Jul. 13, 1994

[87] PCT Pub. No.: WO93/02430

PCT Pub. Date: Feb. 4, 1993

[51] Int. Cl.[6] .................................................. H04K 1/00
[52] U.S. Cl. ............................ 380/49; 380/23; 235/380
[58] Field of Search .......................... 380/23, 25, 4, 380/3, 49; 235/487, 380

[56] References Cited

U.S. PATENT DOCUMENTS

| | | | |
|---|---|---|---|
| 4,466,691 | 8/1984 | Halpern | 235/375 |
| 4,499,556 | 2/1985 | Halpern | 235/487 |
| 4,501,958 | 2/1985 | Glize et al. | 235/380 |
| 4,795,898 | 1/1989 | Bernstein et al. | 235/487 |
| 4,798,322 | 1/1989 | Bernstein et al. | 235/487 |
| 4,906,828 | 3/1990 | Halpern | 235/379 |
| 4,975,898 | 12/1990 | Bernstein et al. | 235/487 |
| 5,280,498 | 1/1994 | Tymes et al. | 375/1 |
| 5,310,999 | 5/1994 | Claus et al. | 380/23 |
| 5,485,520 | 1/1996 | Chaum et al. | 380/24 |
| 5,532,689 | 7/1996 | Bueno | 340/928 |

*Primary Examiner*—David C. Cain

[57] ABSTRACT

A data transfer system transfers data between a smartcard and a reader by transmitting a series of binary pulses, where the absence or presence of single predetermined pulses within the series communicate the data bits. By providing a function mode switch on the card, it may be used both for both private transactions and authorizations at a distance.

34 Claims, 23 Drawing Sheets

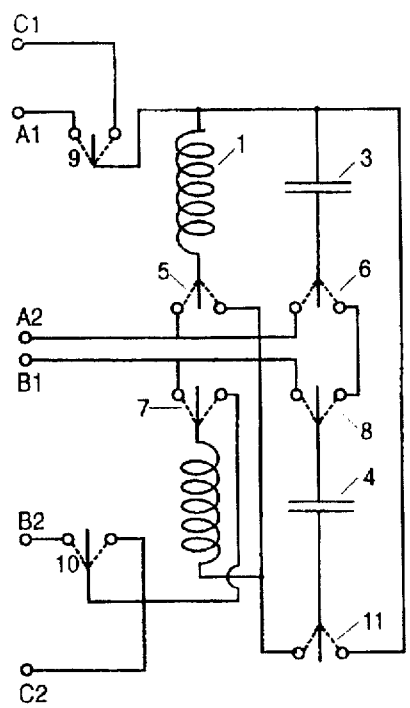
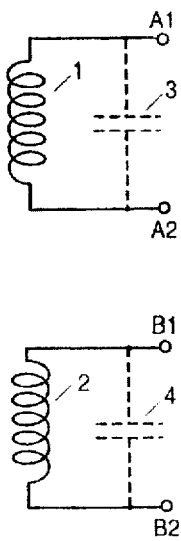
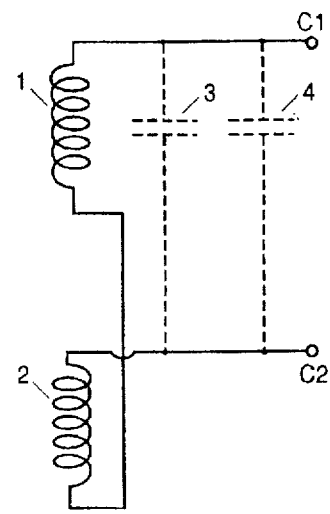
FIG. 10   FIG. 11   FIG. 12
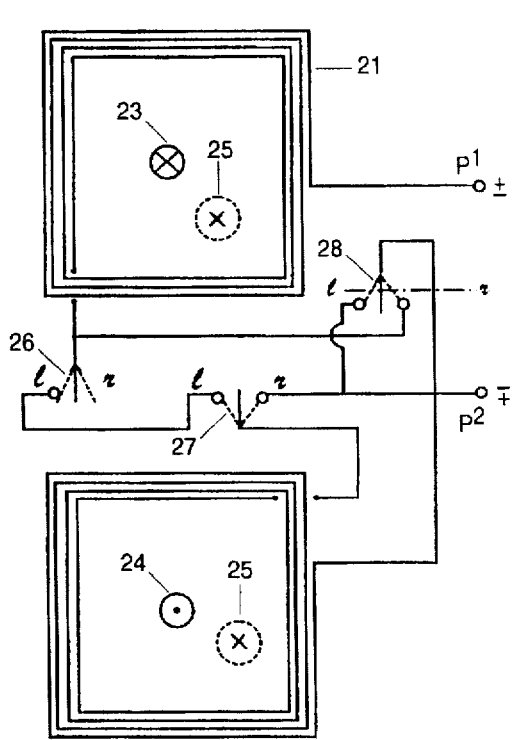
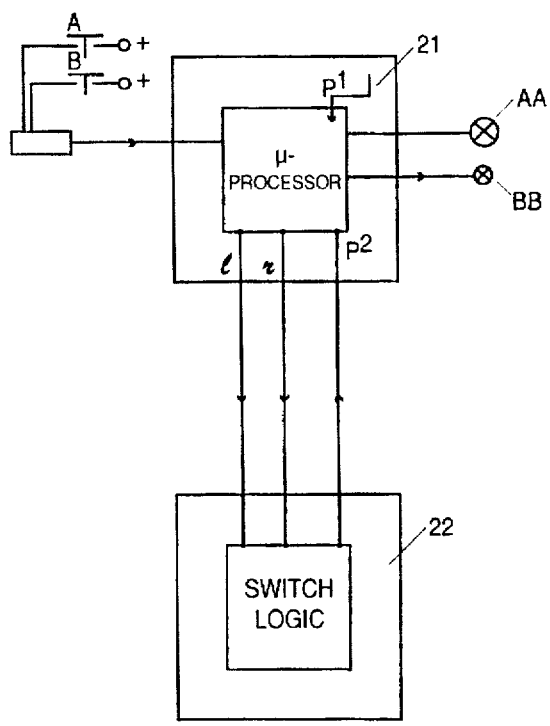
FIG. 13   FIG. 14

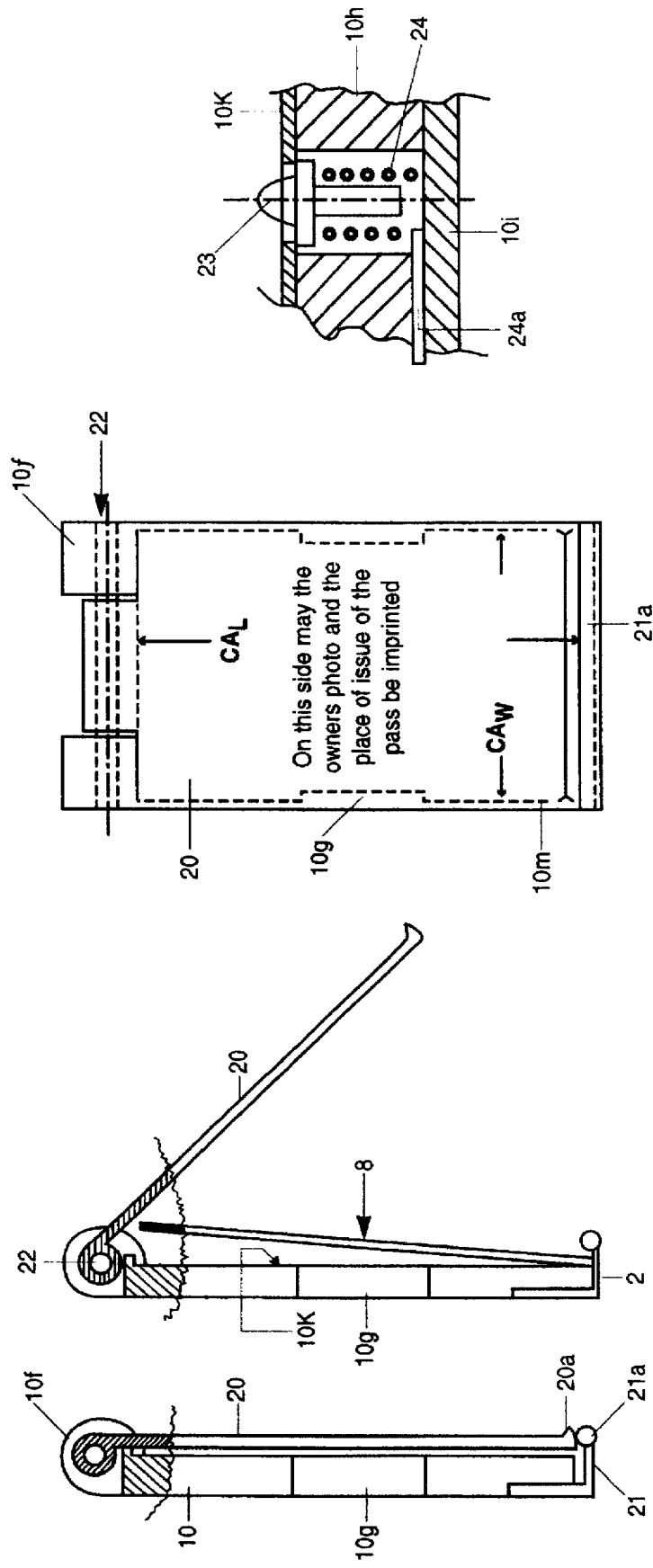

Encoder Buttons:   0 - 9, numerical entries,
En, initial reset and data entry into processor
U, upper case for numbers with meaning as given below
if pushed twice, (double upper case), see other meanings.
I, II, III, IV. stores for bank issued credit amounts
α, β, ɣ = stores for summed-up discounts data,
   for three by customer chosen selling houses.
double arrow button: for moving cursor forward/backward.

Single Upper Case
combined with:

1...AirTravel
2...Other Travel
3...Banking (Updates only)
4...Health and Household
5...Restaurants
6...Groceries etc.
7...Stationaries
8...Business
9...Display expenditure only
   irrespective of category Double Upper Case
combined with:

1...total air travel since update
2...total other travel since update
3...date of last update (for I - IV resp.)
4...total expenditure on HH since update
5...total on restaurants since update
6...total on groceries since update
7...total on stationaries since update
8...total on business items since update
9...display of cash in money store For the following, the PIN must be entered afresh just prior to the codes:

Single Upper Case
combined with:

9+I ...display of residual credit in Credit Store I
9+II ..display of residual credit in Credit Store II
9+III..display of residual credit in Credit Store III
9+IV..display of residual credit in Credit Store IV 9+α..display of accumulated discounts derived from purchases in Discount Shops
   (normally, it is expected that customers will select no more than three shopping
   sources offering recovery of discounts either for additional purchases
   or as cash).
9+β           as above
9+ɣ           as above Double Upper Case
combined with:

Ø ...Cancel the preceding data entry
En...Display instant time and date (correction of time and date can only
            be obtained from a clock terminal).

TABLE I

FIG. 26

ELECTRONIC TRAVEL PASS

This paper deals with a portable private data base in pocketsize format outwardly resembling a pocket calculator and combining a number of inventive characteristics in order to obtain a few important results: Replacement of on-line transactions by secure off-line point of sale transactions. The device should have a long working life. The user should have access to his data at any time without the cooperation of a terminal. During a transaction, the device shall remain handheld to avoid the delays associated with machine-fed read positions.

Insofar as this patent application is concerned we shall refer to said private pocketsize data base as a "travel pass", because of the term's brevity and the expected outstanding utility it may come to have for mass transportation applications. Some of the ideas underlying the present concept of a n "electronic travel pass" have already been defined by the present author, especially in U.S. Pat. No 4,661,691 (Proximity Data Transfer System) or U.S. Pat. No. 4,499,556 which deals with the problem of security for long-life cards, or U.S. Pat. No. 4,906,828 which describes data entry on the card itself, and U.S. Pat. No. 4,906,828 which describes a simple scrambling circuit for protecting the secrecy of the data interchanged between a card and a transaction Reader.

Further inventive effort was necessary to provide a "travel pass" with greater data transfer speed; to protect the integrity of the data in face of exterior electric noise or interference; to enlarge its usefulness; to enable the owner of the "travel pass" to select his/her secret PIN and to change it at any time, without the assistance from a second person or office; to convert a travel pass which normally can only communicate with a terminal at close proximity, into a radio-responsive card capable of passing on its serial number or account number over a distance of several feet.

Descriptions of these various aspects will now be given with the aid of illustrations and drawings, wherein FIG. 1 is a block diagram of stationary apparatus forming a part of the invention.

Figure 1:
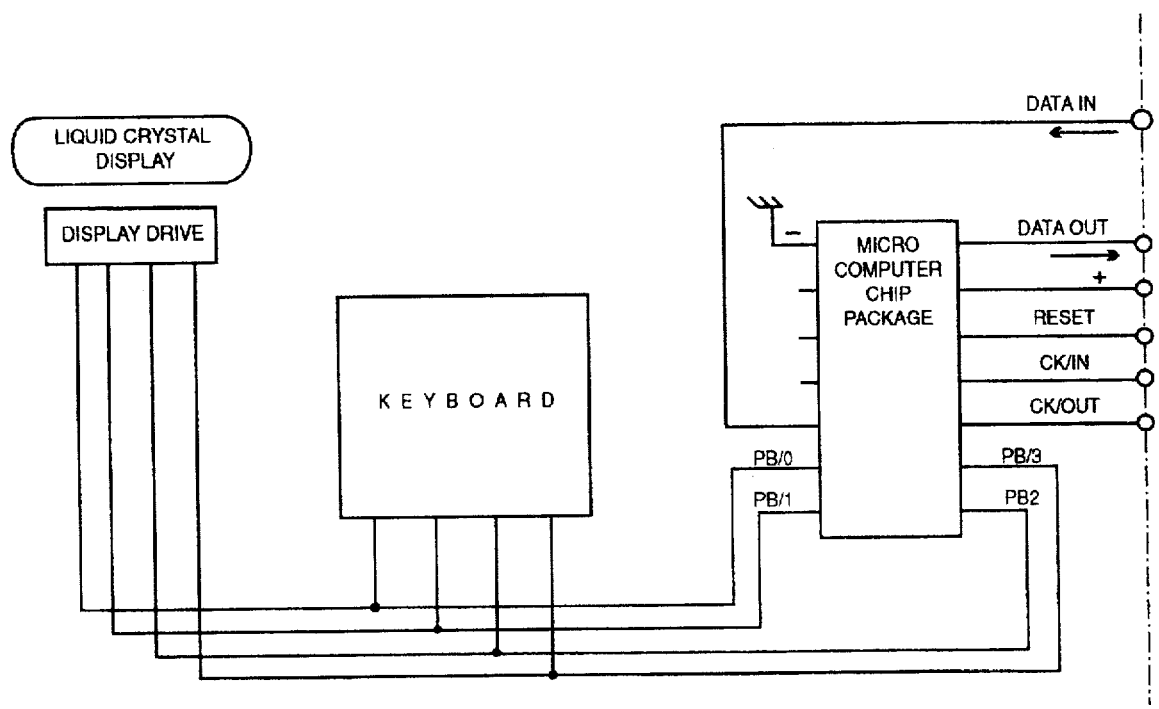
FIG. 1a is a front view of the Smart Contactless Security Key which may be used with the invention.
FIG. 1b shows a card with two embedded capacitive antenna plates and a data retrieval circuit associated with them.
FIG. 1c and FIG. 1d show an equivalent circuit explaining data transfer by impedance changes
Figure 1A:
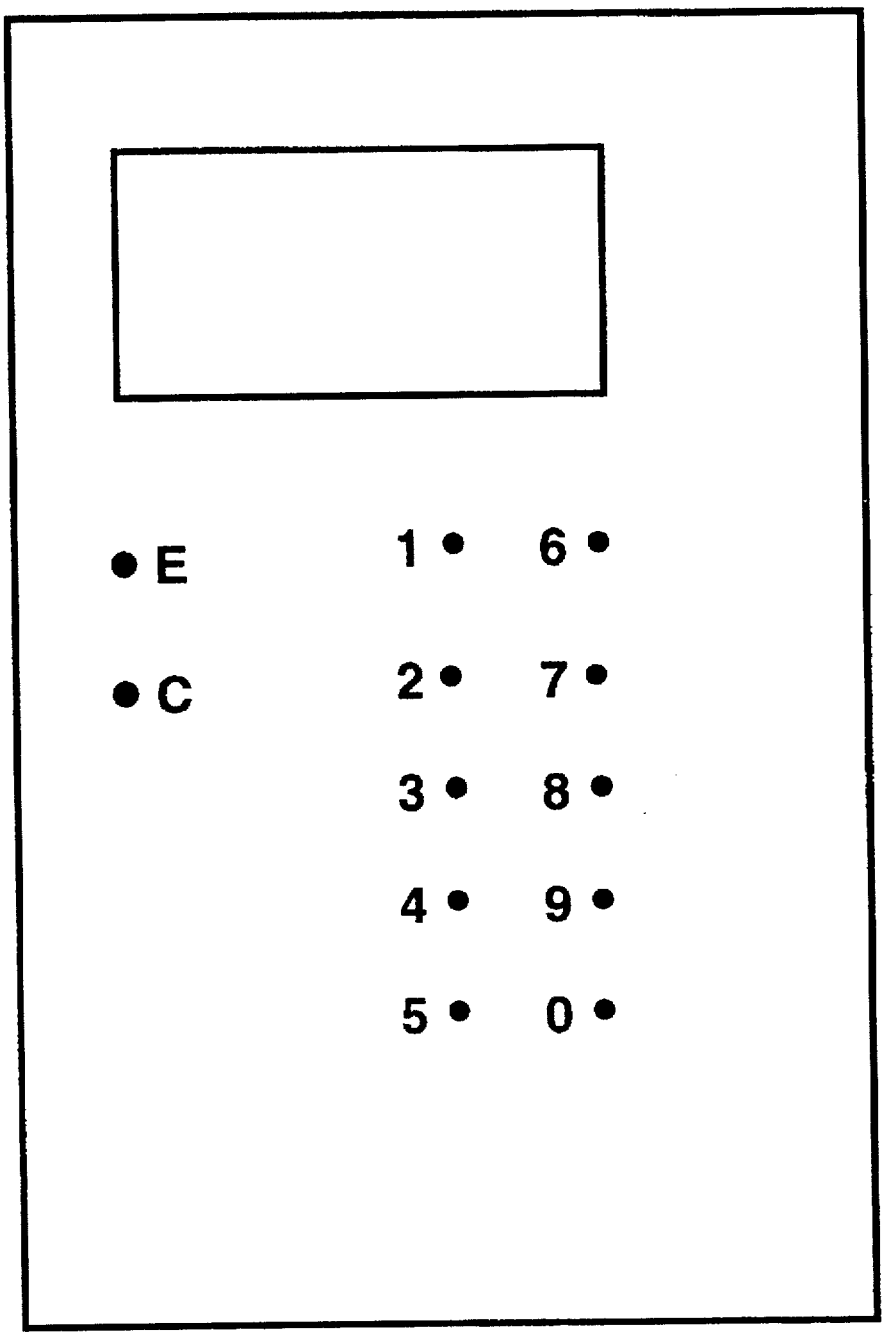
Figure 1B:
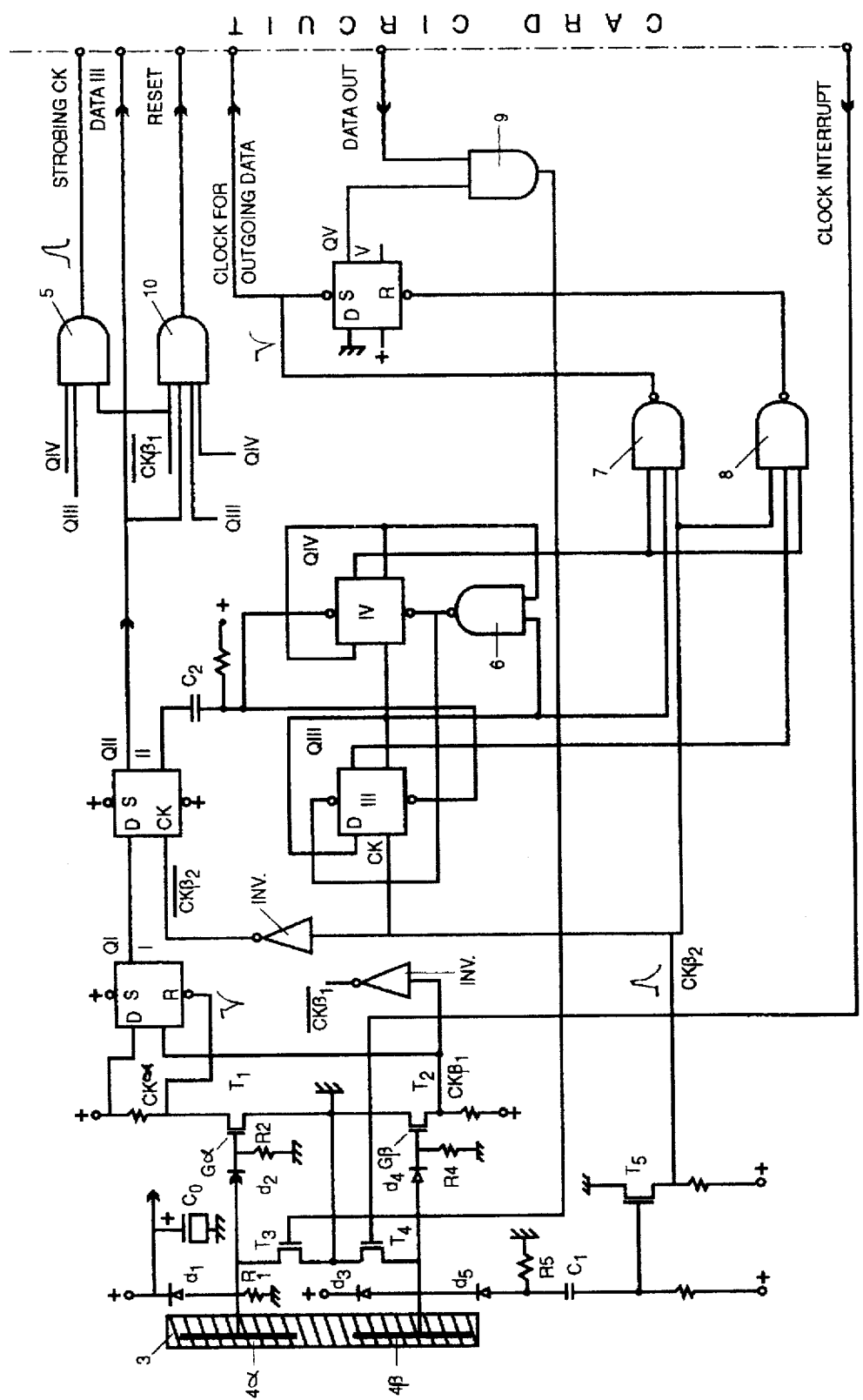
Figure 4:
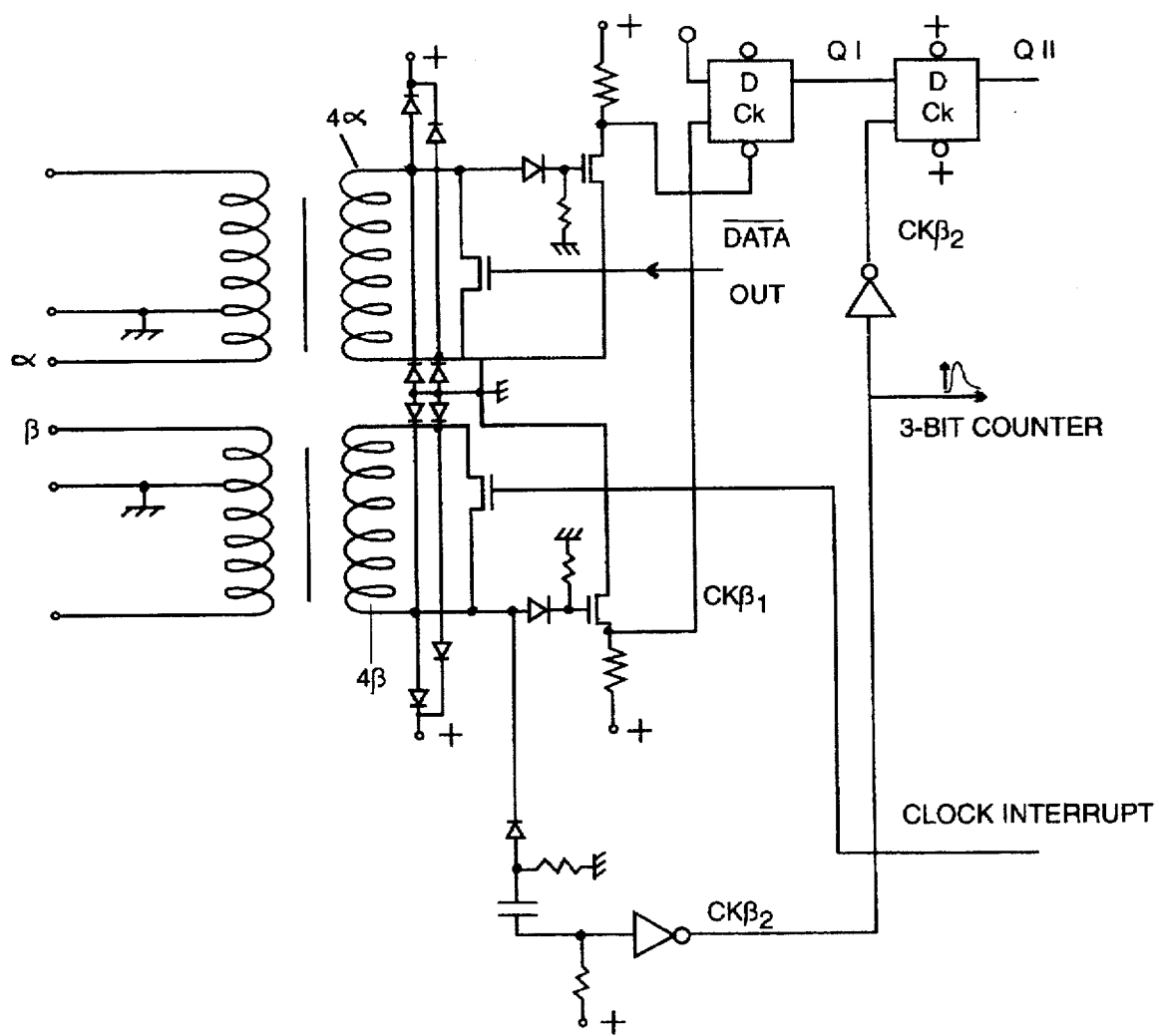

FIG. 4 indicates the modifications of the FIG. 1 circuitry when in place of the capacitor antenna a flat spiral coil is laid into the card and Reader respectively.

Figure 5:
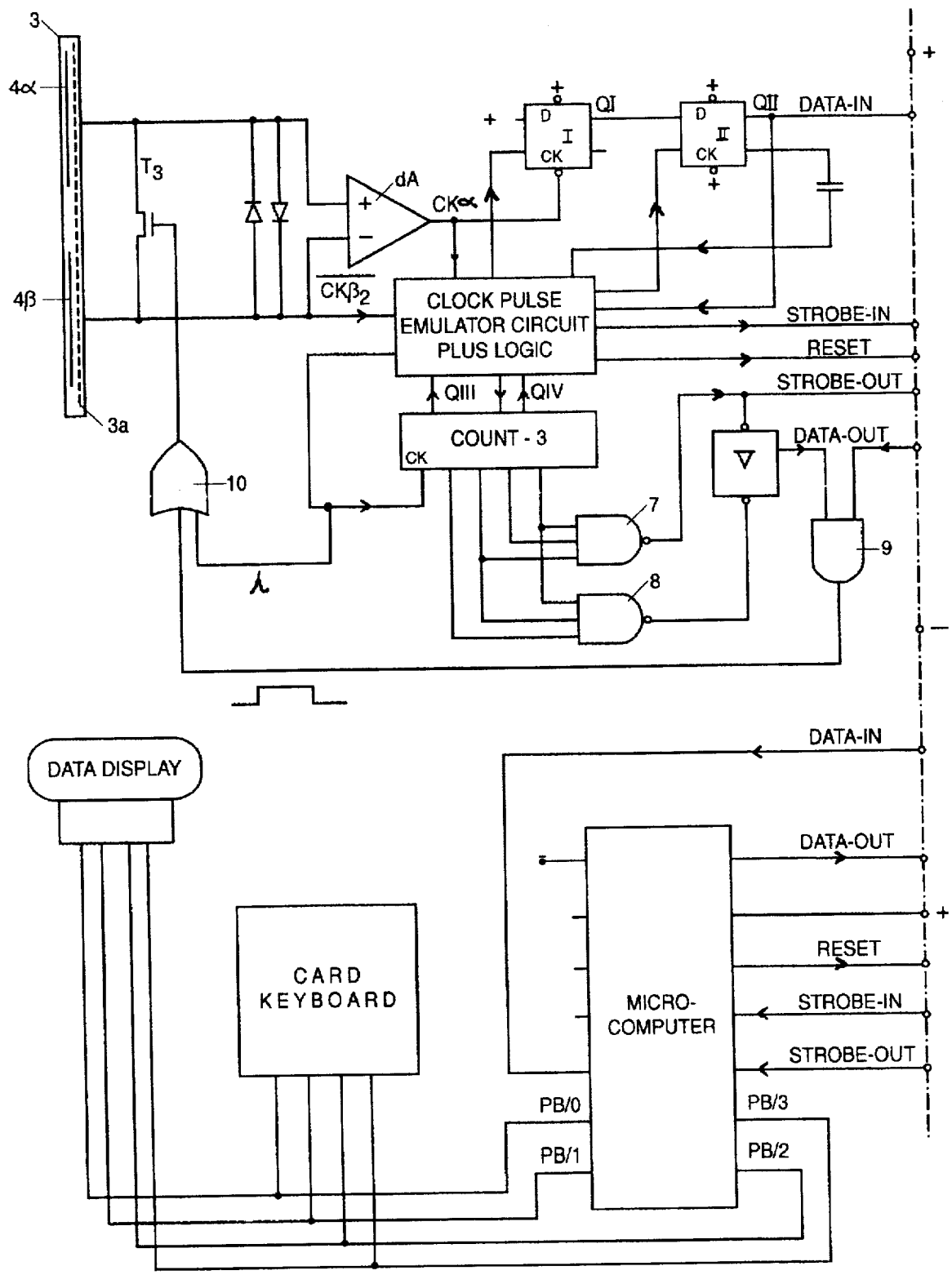

FIG. 5 illustrates the basic schematics of a "travel pass" combined with a modified form of the FIG. 1 circuit.

Figure 6:
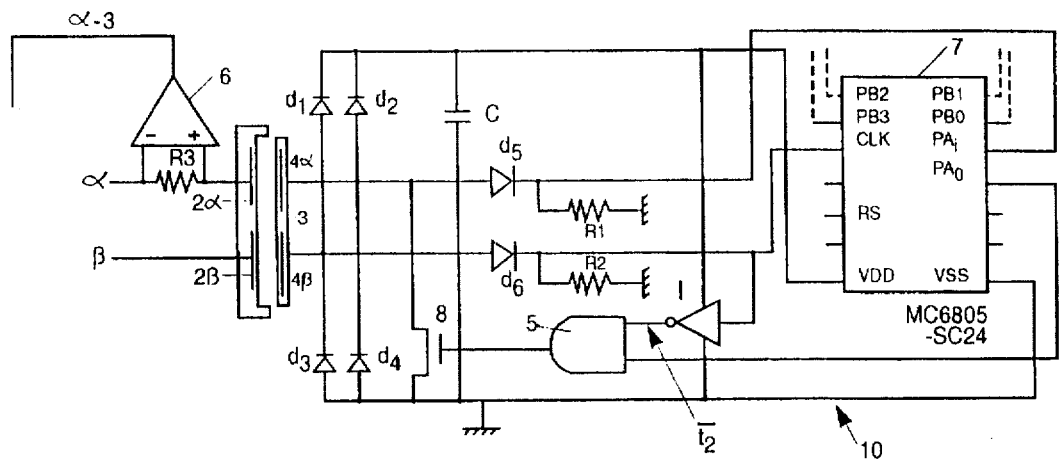

FIG. 6 shows a Reader and proximity-operated Card or "travel pass" with a a very simple data retrieval circuit connected to a Motorola CMOS microcomputer. chip. In this design, the square pulses imputted in FIG. 1, are now replaced by VHF sin waves applied to the same twin capacitor plates in antiphase.

Figure 7:
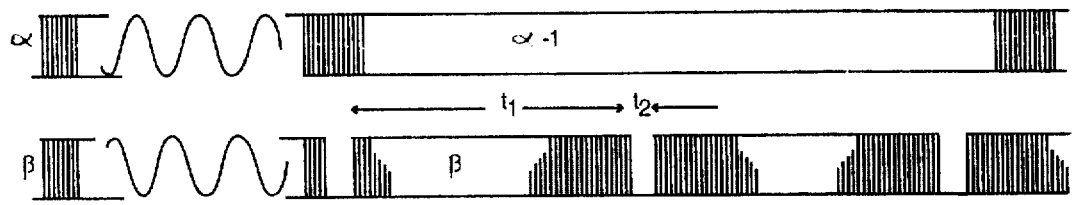

FIG. 7 shows a string of $\alpha$ sin waves used for data modulation, and the string of $\beta$ sin waves used for producing timing pulses.

Figure 8:
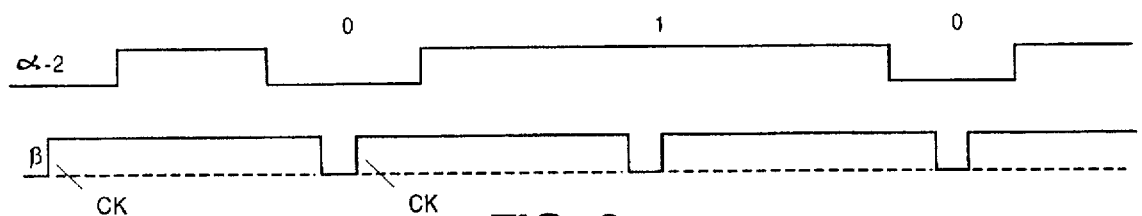

FIG. 8 represents an example of logic levels transferred to the "travel pass" as data and logic levels applied to the "travel pass" computer chip as clock pulses.

FIG. 9 shows again the clock pulses (CK) and the ($\alpha$-3) output from the differential amplifier representing data transferred from the card to the Reader.

FIG. 10 shows two spiral coils connected in phase, to satisfy the condition for cooperating with short-distance proximity Readers; they are connected via switches in such a manner that they may work in anti-phase with the Reader emitters, and that makes them suitable for working in phase with a radio transmitter at a modest distance.

FIG. 11 shows the effective card circuit when the switches are in one position

FIG. 12 shows the effective card circuit of the coils when the switches are in their other position.

FIG. 13 shows two spiral coils connected in phase for short distance Readers, but in antiphase for any 'common mode' signal (usually a noise signal).

FIG. 14 shows the same arrangement of coils as in FIG. 13, but the coils are implanted into a silicon chip whereby the upper chip has in the center of the coil an integrated minicomputer, and the lower chip has at its center solid state integrated semiconductor switches.

Figure 15:
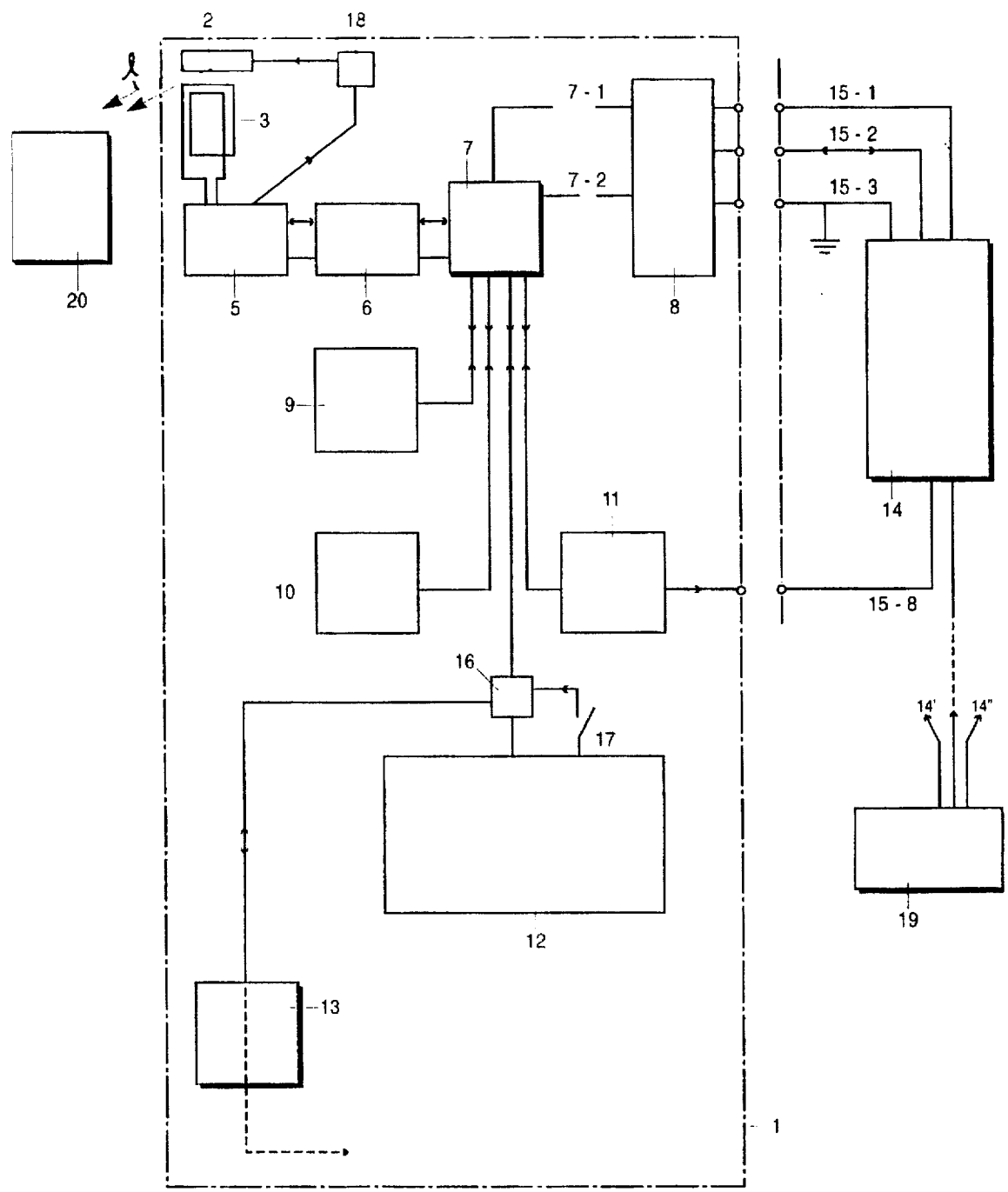

FIG. 15 relates to a fare collection system for use with "travel passes" and relates to program structure for testing the travel pass for various criteria before deducting a fare, and, if the residual value is inadequate to cover a minimum fare or the required maximum fare respectively, the control system puts into operation an updating unit after checking a blacklisting register.

Figure 16:
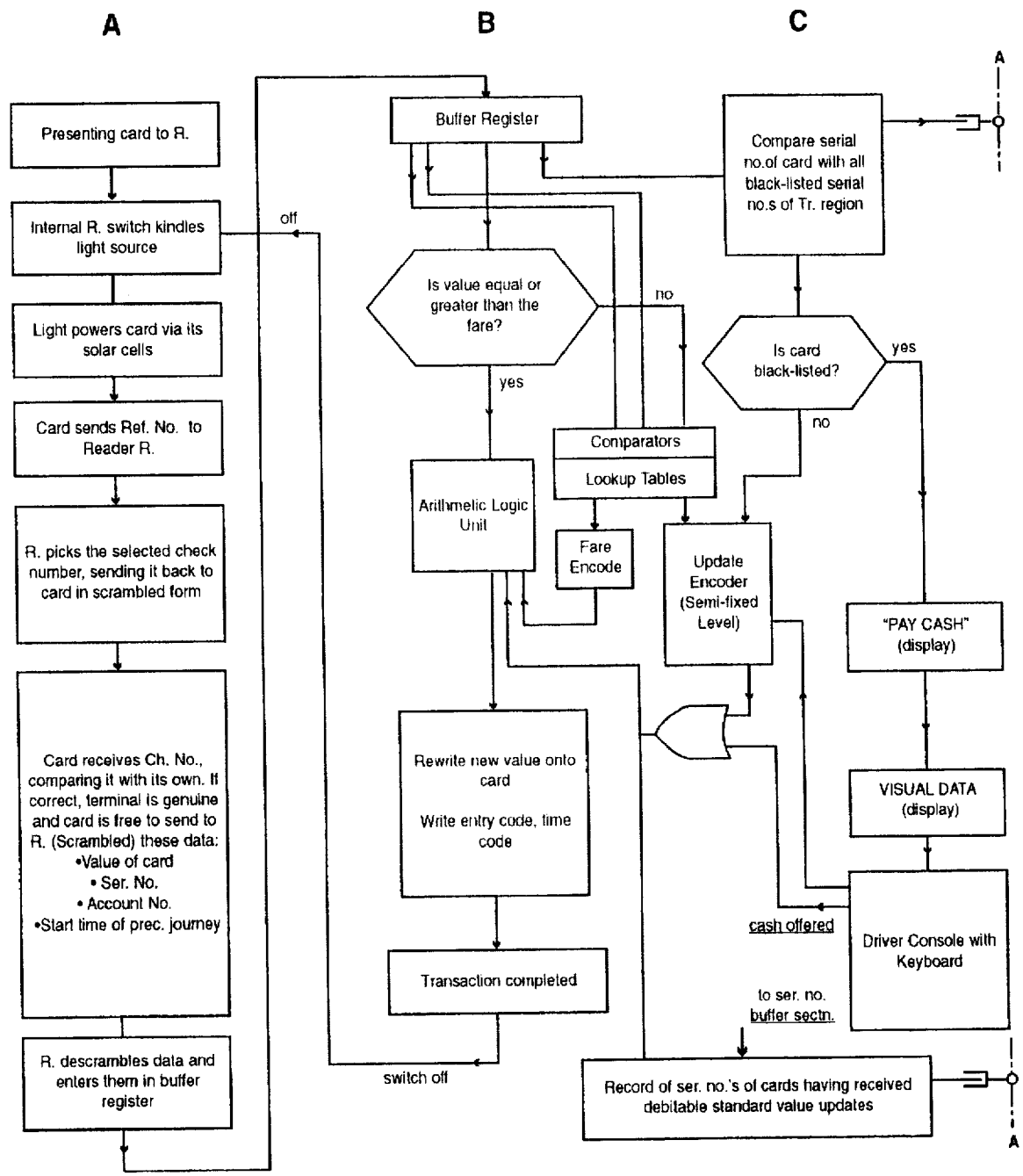
Figure 17:
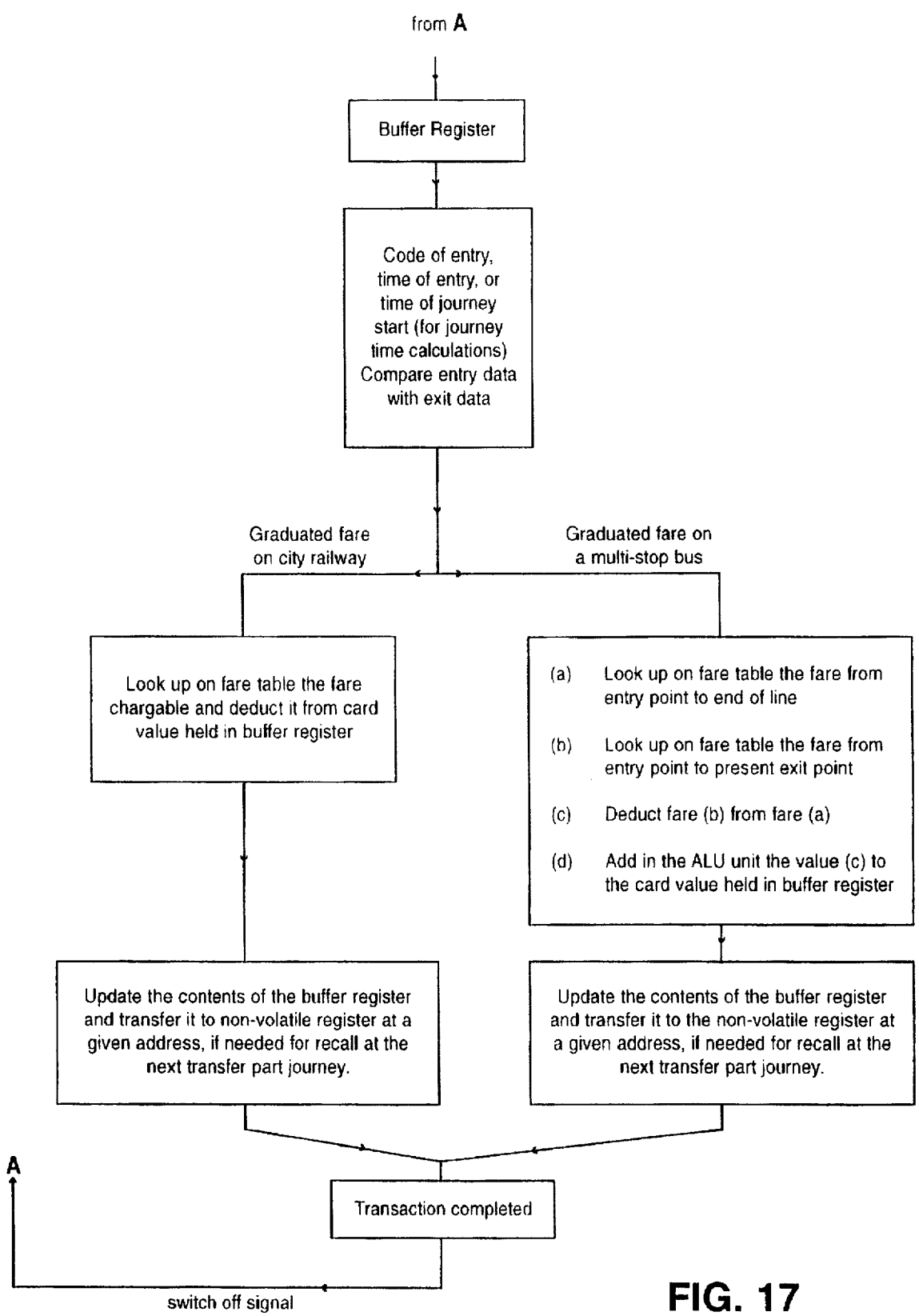

FIG. 16 and FIG. 17 are even flow diagrams for flat fare and graduated fare operation respectively.

Figure 19:
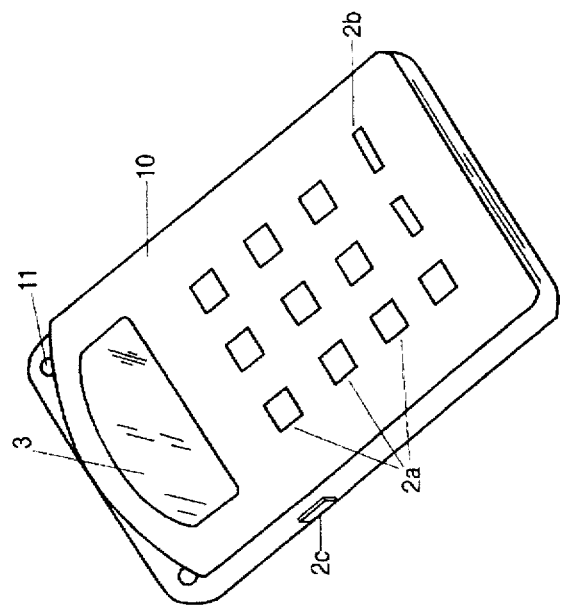
Figure 18:
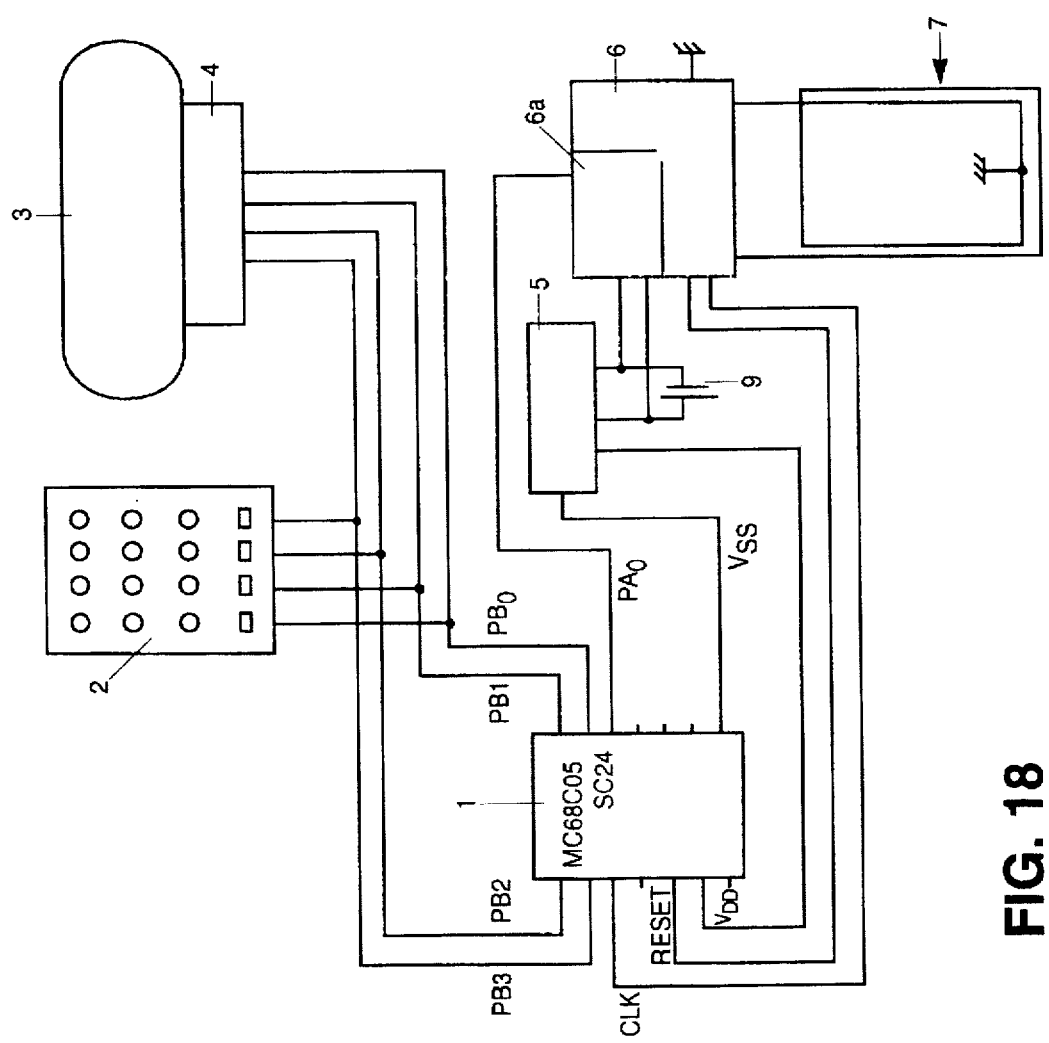

FIGS. 18 & 19 show a perspective view of-the "travel pass".

Figure 19A:
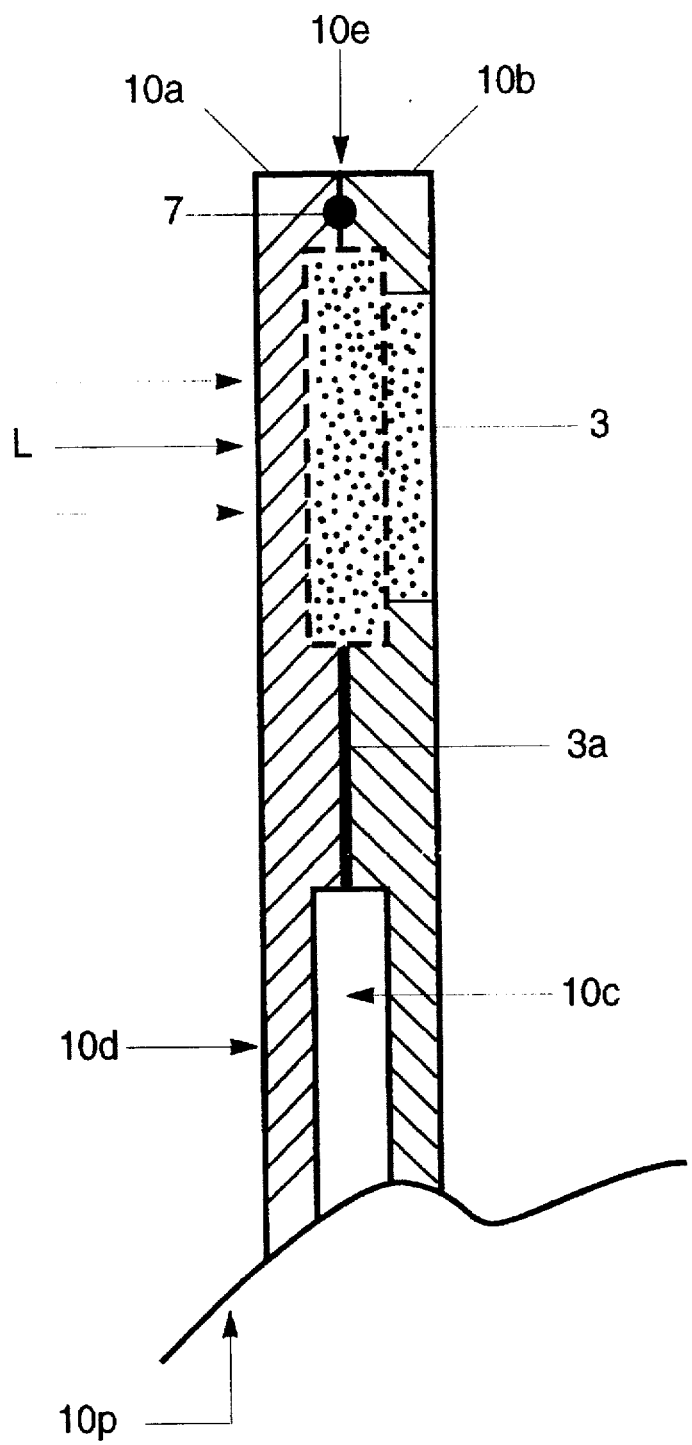

FIG. 19a is a detail of the display window in the card wherein the contrast of the display is improved by a light L derived from a light source in the Reader Unit.

Figure 20:
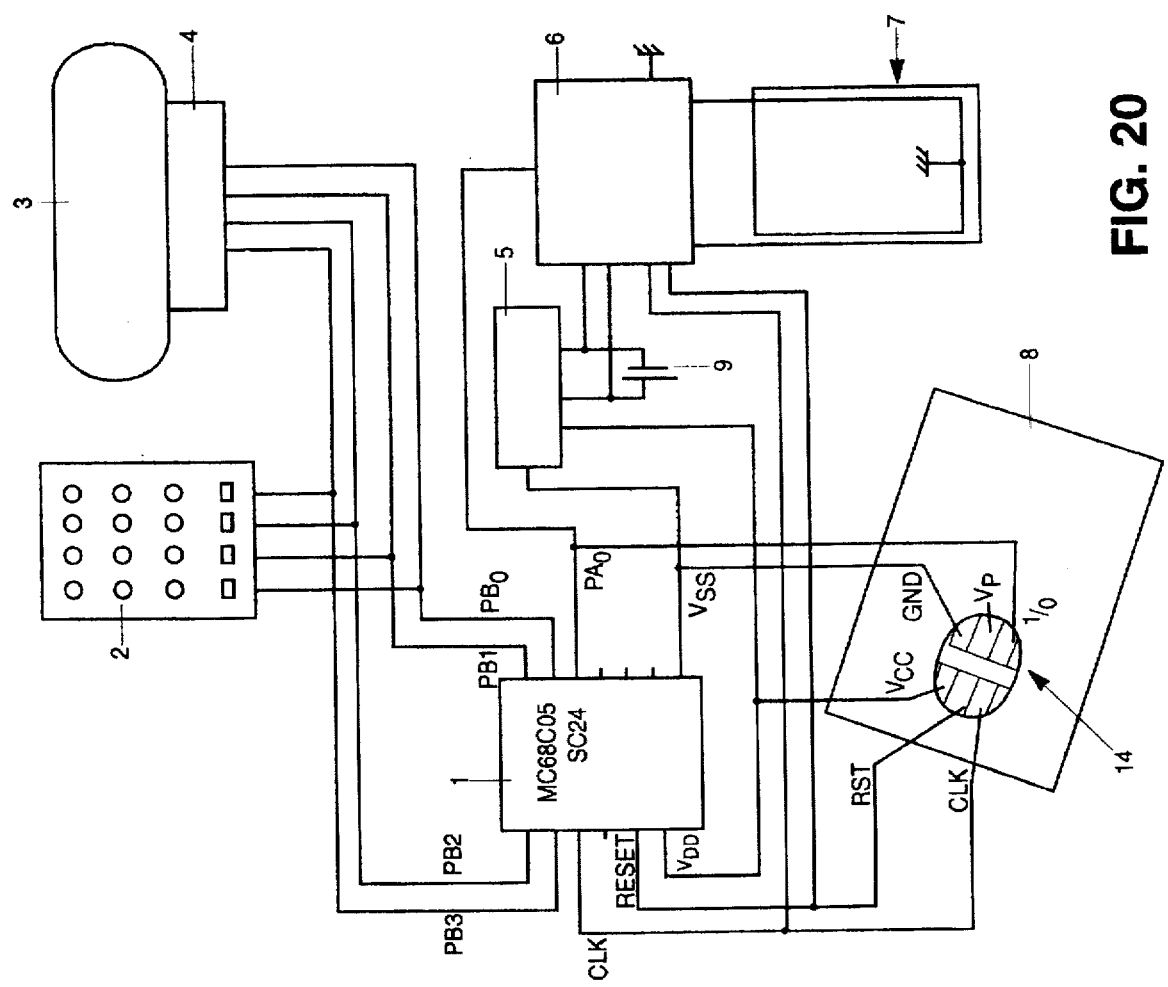

FIG. 20 shows a "travel pass" circuit wherein the electronic value memory is provided by a standard size smart card inserted into the said pass.

Figure 21:
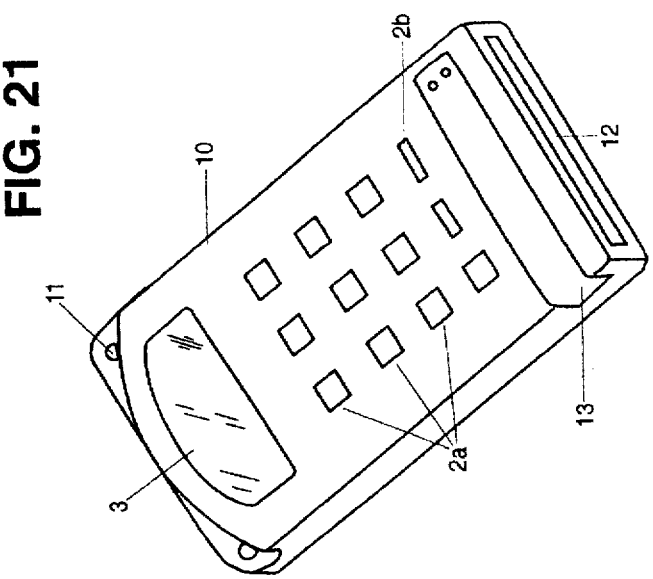

FIG. 21 is a perspective view of a travel pass with a facility to accept a cardlike prepaid cash component.

FIG. 22 shows another type of provision for electrically connecting a standard smart card to the "travel pass" device.

FIG. 23 shows a further detail

FIG. 24 is a cross section of one of the four or five spring loaded contact pins.

Figure 25:
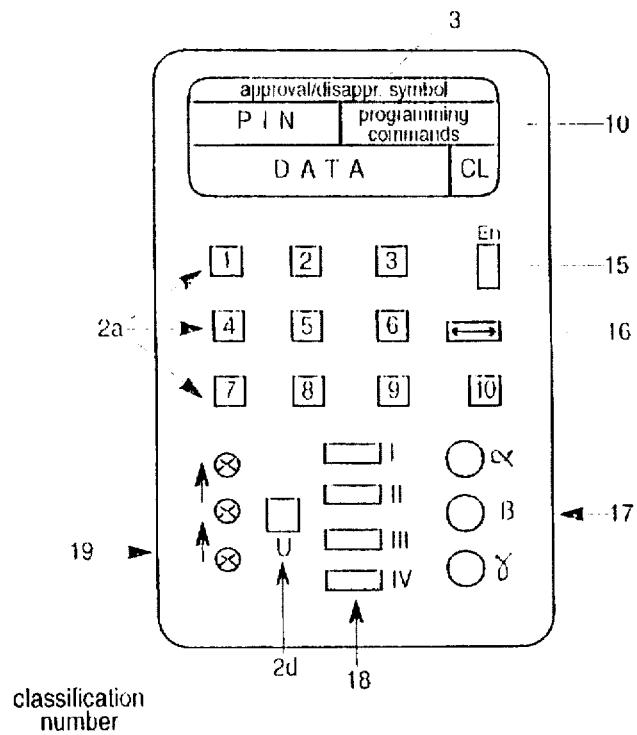
Figure 25A:
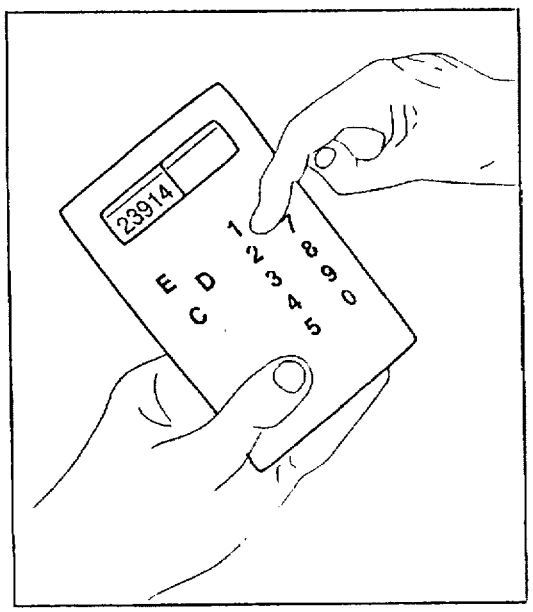
Figure 25B:
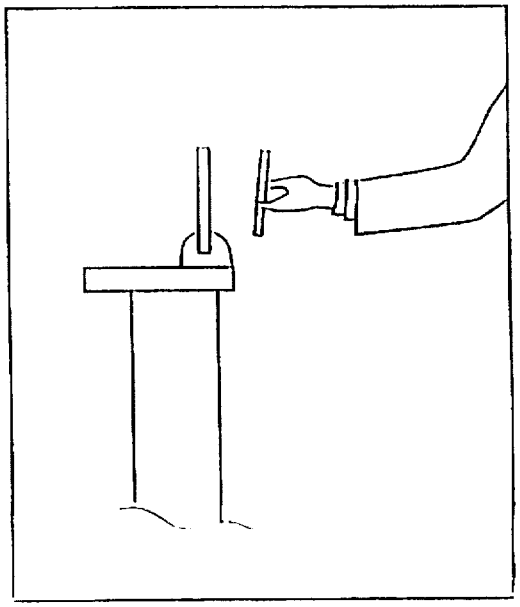

FIG. 25 shows an example of a keyboard with numerical and functional keys such as a "universal travel pass" might be equipped with.

FIG. 26 provides a guide for the use of the keyboard of FIG. 25

Figure 27:
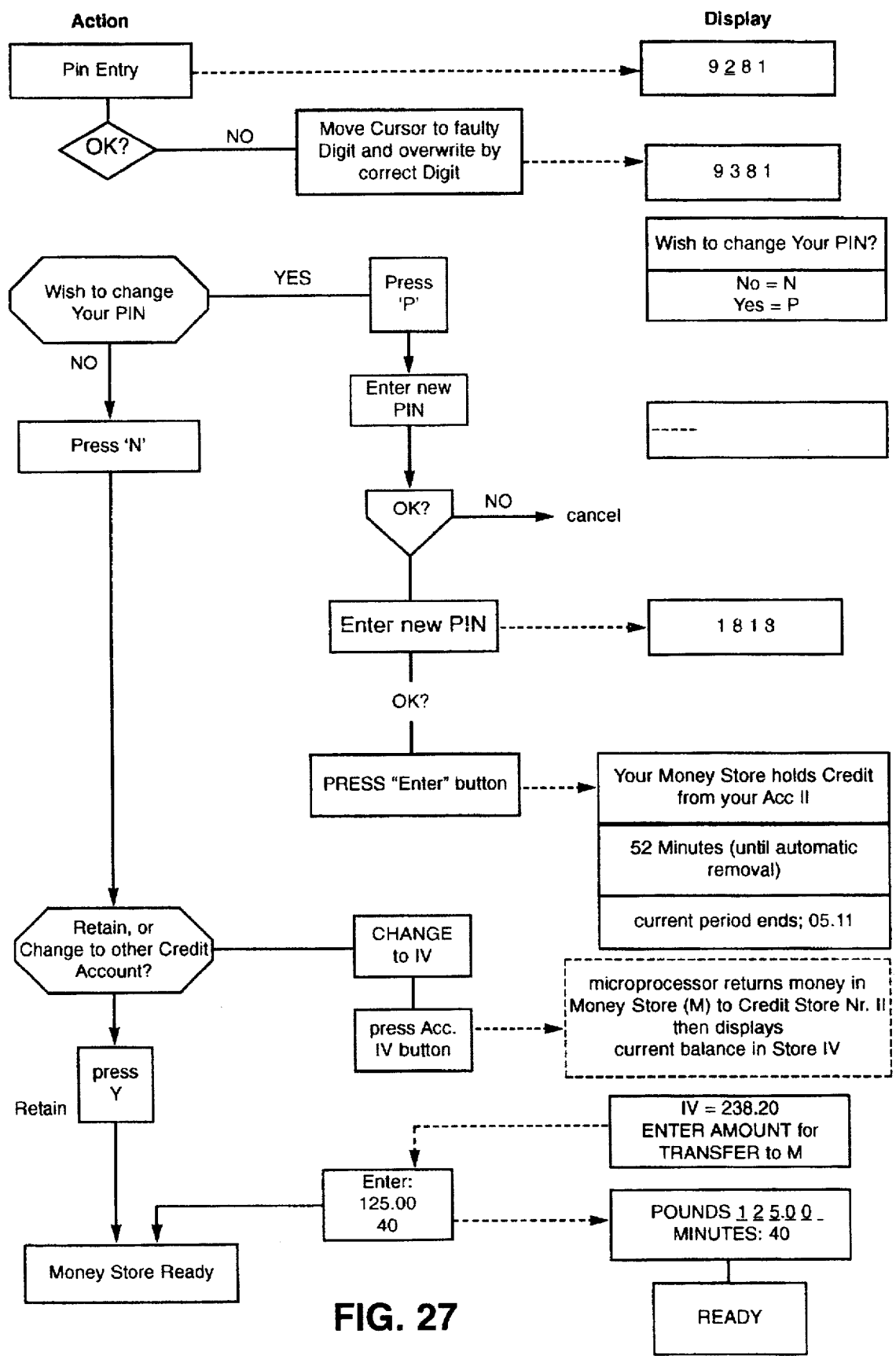

FIG. 27 is a logic flow diagram for various optional preparations which the user of a "travel pass" would make dependent on his intentions or anticipations of useage.

Figure 28:
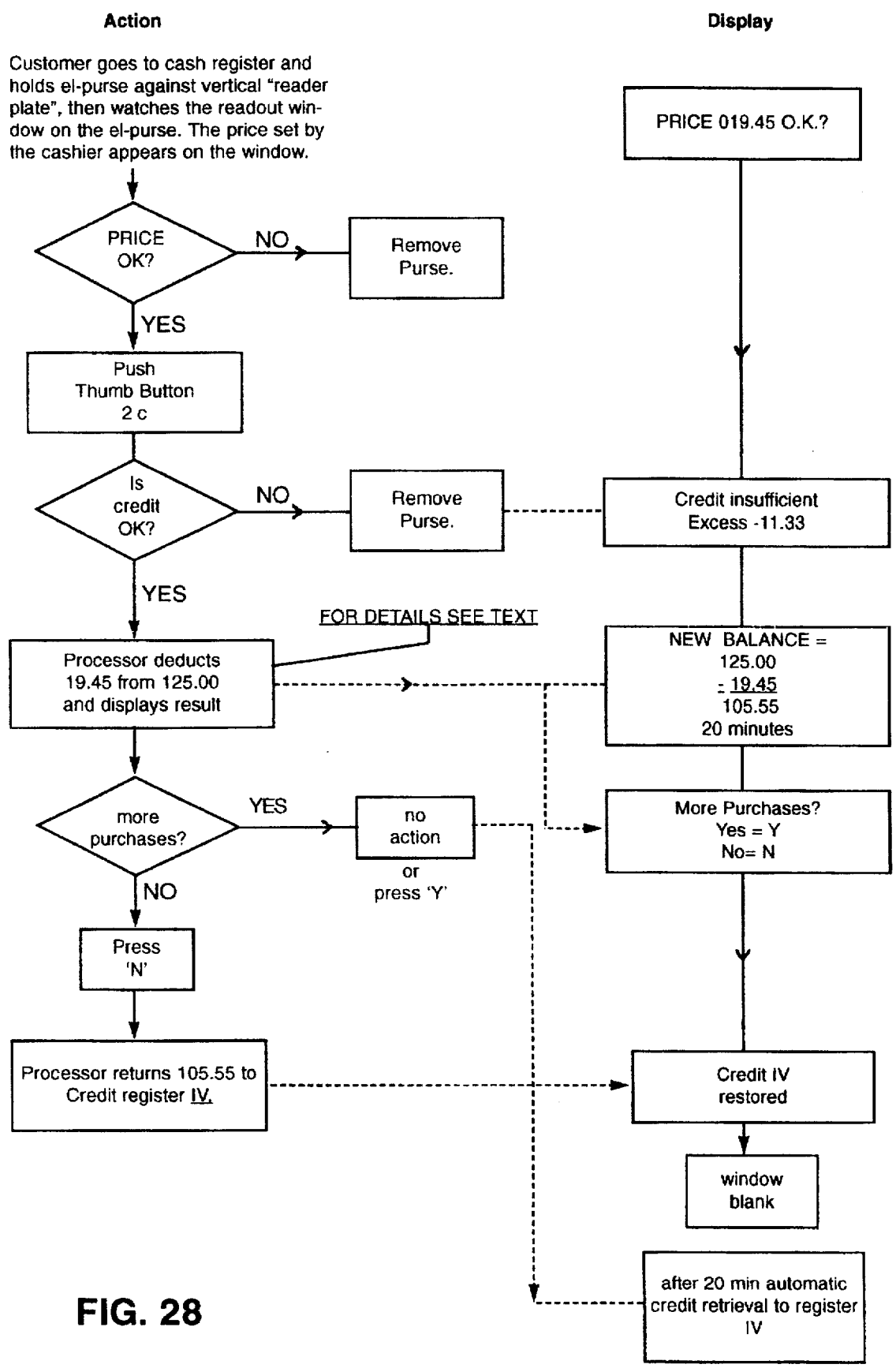

FIG. 28 displays various optional procedures for using a travel pass at a vending machine or a market point of sale desk.

For many applications, but especially for certain forms of fare collection, it is very important to reduce the total transaction time, and that cannot be done unless (a) the data transfer speed is stepped up substantially, and (b) the card remains handheld during the period of the transaction.

Ideally, a passenger on mounting a bus need not do more than holding his travel pass against the surface of a Read/ Write unit for a brief period of time during which all the necessary card checking and updating is performed. Alternatively, the travel pass is briefly inserted into wide open acceptor area (such as a shallow slot) where wide tolerances permit easy and rapid insertion and withdrawal of the card device;

A fast synchronous data transfer circuit is hereunder described. The synchronization between the operation of the checkout unit and that of the travel pass electronics is obtained by a new approach. The proposal also includes protection against random noise.

Figure 3:
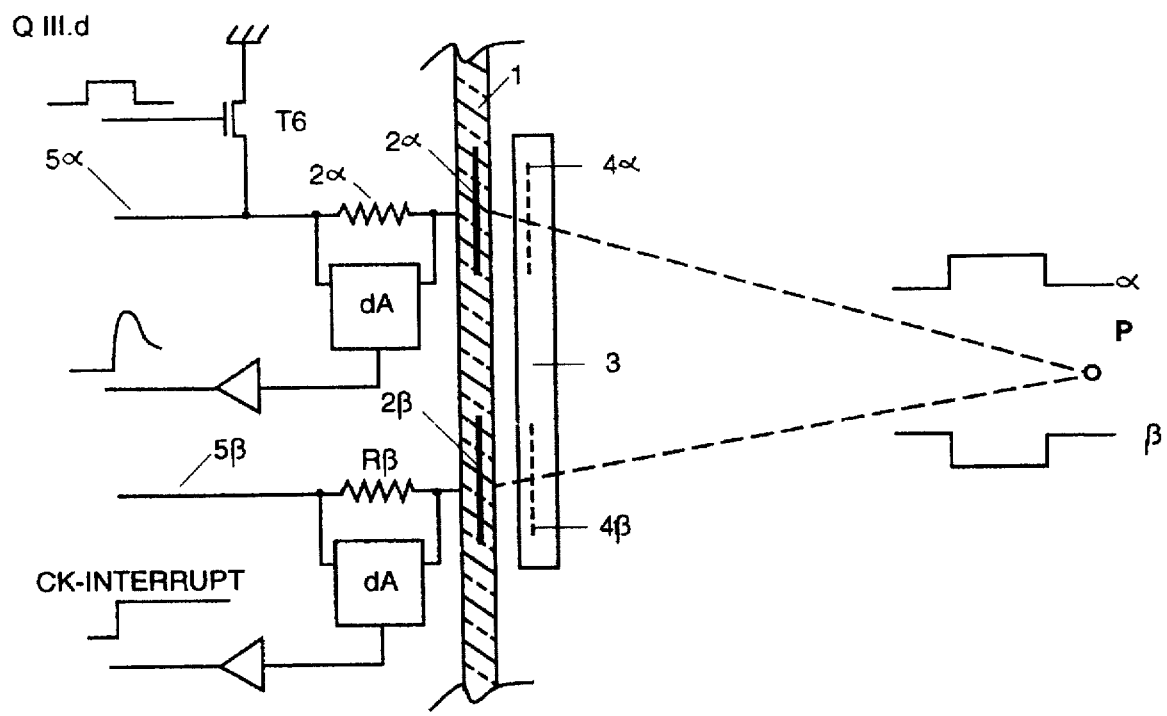
FIG. 3 shows portions of the signal emitter circuit of the Card READER unit which is largely a mirror image of the circuit of FIG. 1b.

To begin with, FIG. 3 shows the approximate mutual position of the emitter plates 1 arranged on the Read/Write terminal, and the corresponding antenna plates 3 arranged on the backside of the "Travel Pass". The spacing between the metal plates $2\alpha$ and $2\beta$, and the metal plates $4\alpha$ and $4\beta$ would be between 5 to 30 mm. The $\alpha$ line carries square pulses and so does the $\beta$ line but 180°, phase shifted against the former.

Figure 2:
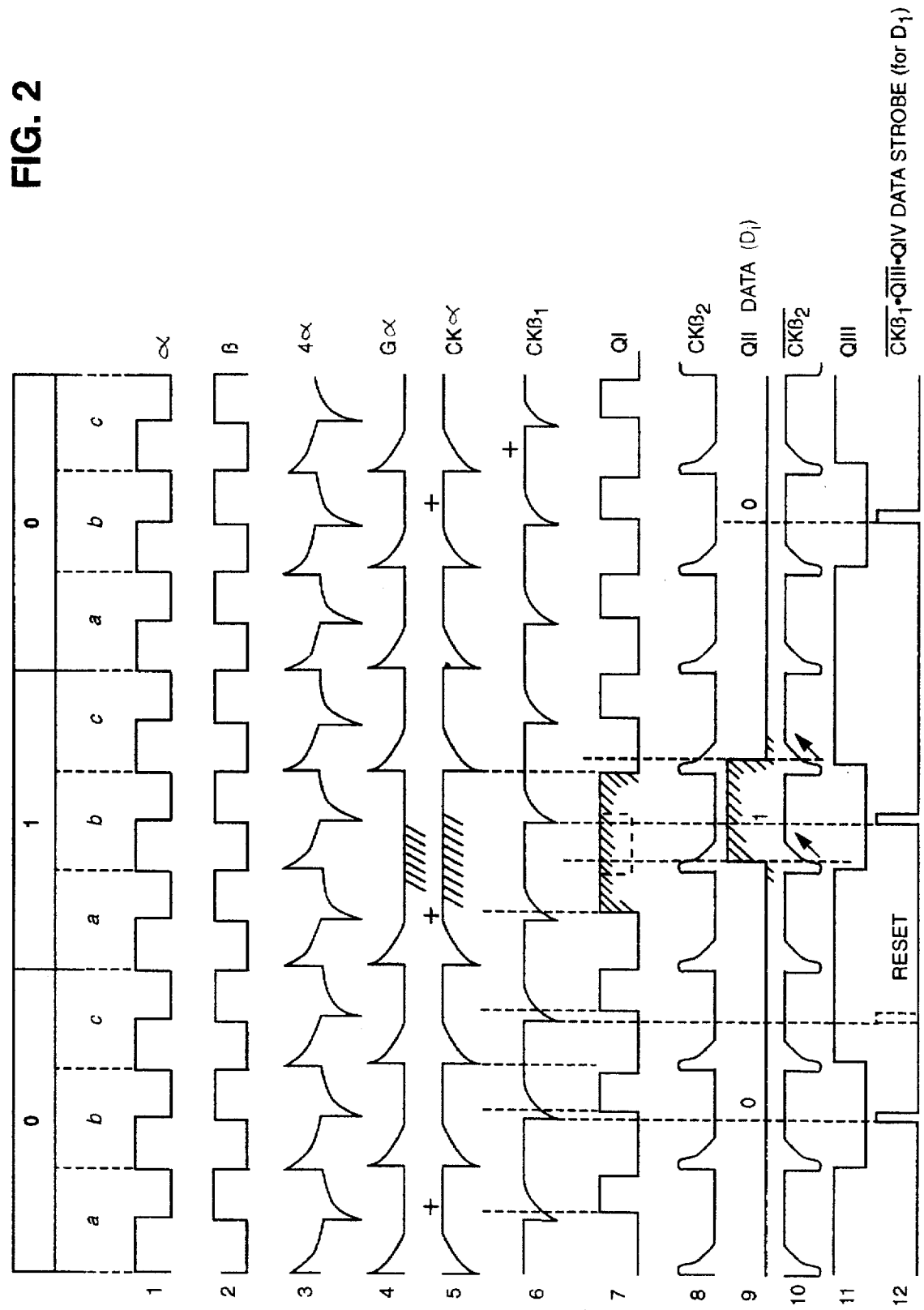
FIG. 2 shows an example of the wave forms at different parts of the circuit.

FIG. 2 contains 12 voltage-time diagrams. On rows 1 and 2 the input signals $2\alpha$ and $2\beta$ are shown. The voltages that arise from the reactive transfer on the metal plates $4\alpha$ and $4\beta$ respectively would be similar to those shown on rows 1 and 2 respectively if the impedances of leakages to quasiground level were very high, say 50 MOhm. At lower bleeder resistances, say 5 MOhm, the differentiator effect comes into play. See row 3 for the $4\alpha$ pulses.

The transfer circuit is shown in FIG. 1$b$. T1 and T2 are field effect transistors.

The general data transfer parameters can be described as follows: Each data binary bit is embedded in one of three clock pulses; more accurately, it is embedded in the second one of three clock pulse positions. If a number contains many zeros, the monotonous flow of clock pulses continues unchanged. The clock pulses occur in groups of three, counting a,b,c—a,b,c etc. A data bit can appear only during the part period 'b'. A logic one is represented by the absence of a clock pulse during period 'b'.

The basis of synchronization is the two-bit counter using two D-type bistables III and IV. In our example, the repetitive count is given by the states 1,2,3; the state 0 is skipped, using 'and' gate 6 for this purpose. A high data bit to be transfered from the card circuit 100 to the Reader unit must pass through the A N D gate 9 which is enabled only during the 'b' period (count 2) of the counter. If the data to be transfered are held in a shift register the shift clock is obtained as an output from the NAND gate 7 at the beginning of each 'b' period. Any high output from the AND gate 9 is applied to the control gate of the transistor T3 which then virtually shortens the capacitor plate $4\alpha$ to a reference level, quasi ground level. As a consequence there is a low resistance path from the plate $4\alpha$ to the plate $4\beta$ which amounts to a drastic reduction of impedance to the supply line of the $2\beta$ imput pulses. As a consequence there will be a major increase in the load current across the resistor $R\alpha$ in the Reader unit. This is detected by a sensor element dA and used in the further circuitry of the READER UNIT to represent a logic "1" level in the Reader Computer.

The data transfer in the opposite direction, from the Reader to the card, is done as follows:

As can be seen from FIG. 3 a high data bit is applied to the gate of transistor T6 which virtually eliminates during time period "b" the clock pulse potential on the capacitor antenna $2\alpha$. As a consequence, in FIG. 1$b$, this eliminates any voltage on gate $G\alpha$, so that the reset potential of input point R remains high and the already set bistable I remains set with QI output being high. These conditions can be followed through also on the voltage-time curves of FIG. 2:

On row 4 the gate $G\alpha$ suddenly does not receive the regular spike, nor does the negative going reset spike develop on row 5 (CK$\alpha$). The bistable output QI (row 7) changes from producing square pulses to remaining high over a period of two pulses. This also affects the next bistable II output, row 9. Strobed by clock pulses CK$\beta_2$, QII goes now high shortly after the beginning of time period 'b' and remains so until shortly after the end of period 'b'. To obtain a data output which is cleanly cut off at the end of period 'b', one would have to provide extra gating but this is in practice not needed. The small overlap is not of any consequence. The output of AND gate 5 represents a strobing spike roughly in the middle of each time sector (a,b,c), and therefore, the down-stream circuit (the card circuit) can use this spike for clocking the data (Q II) into its register.

Finally, if the READER COMPUTER routine wise emits a reset signal to ensure that all the registers and bistables of the receiving circuits are cleared before passing on a command etc., this can also be done by means of the present interface circuit. In this case, after the first data bit is sent in time sector 'b', another data bit is applied immediately following in time sector 'c'. This keeps the data output on line 9 of FIG. 2 high over the time periods 'b' and 'c'. The CK$\beta_1$ spike during the middle of period 'c' is a unique pulse useable by the downstream circuitry as a reset pulse. It is obtained as an output from the four-input AND gate 10 in FIG. 1.

FIG. 4 shows essentially the sane circuitry when in place of a capacitor plate an inductive coil ($2\alpha$-$4\alpha$, $2\beta$-$4\beta$) is used. Such coils are preferably configured as spiral coils on printed film. When a logic "1" is to be sent from the Reader to the Travel Pass (card) the clock pulse in time sector 'b' is stopped by the transistor T7 of the PNP type while the NPN transistor T8 shortens the coil to ground to ensure that no noise spike gets through during period 'b'.

Figures 1C, 1D:
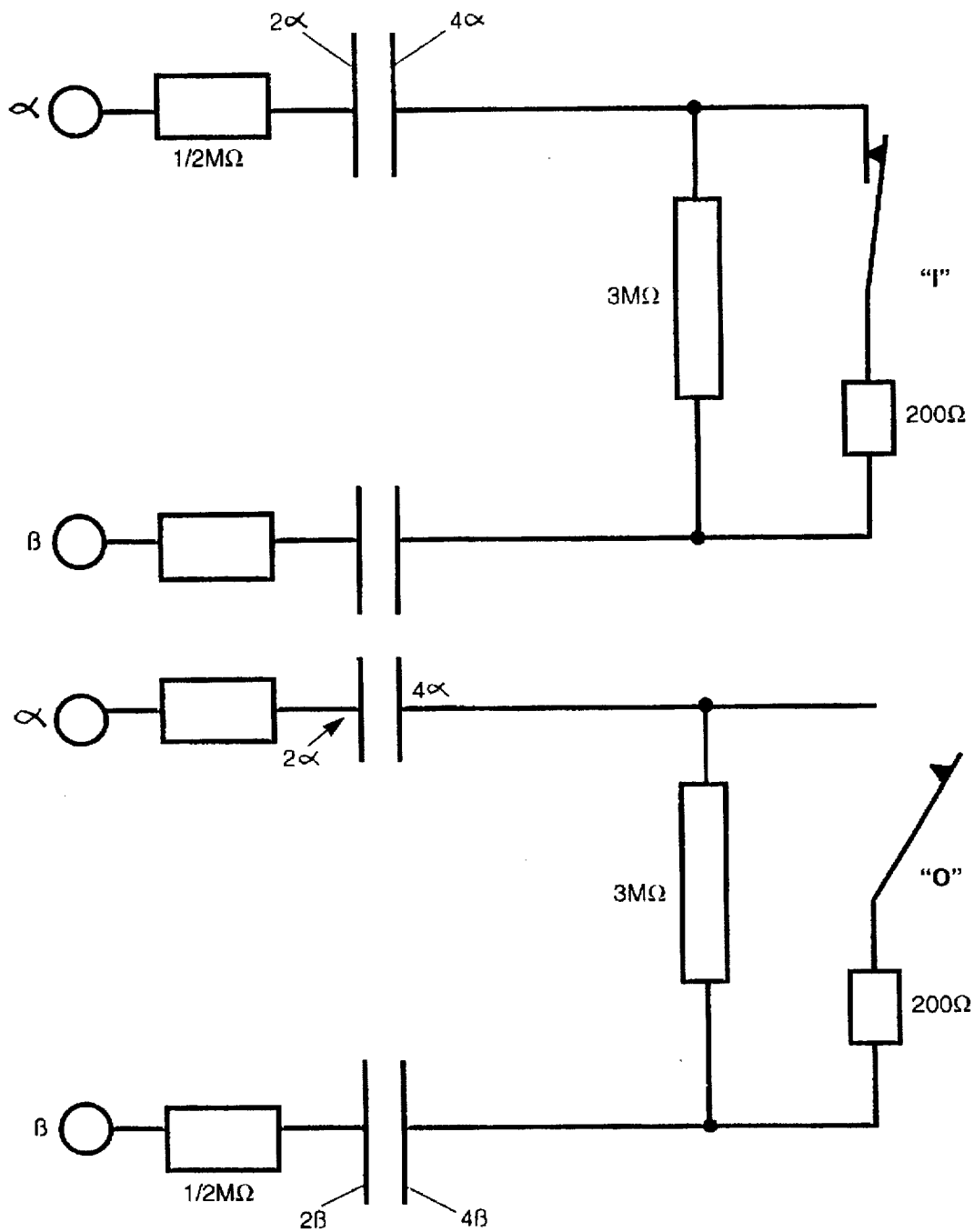

FIG. 1C makes clear how a data pulse is transferred. High frequency clock pulses are applied in opposite phases to terminals $\alpha$ and $\beta$. When the switch is open the load is 3 M$\Omega$, when closed it drops to a few hundred $\Omega$. The capacitor plate on the left having been at normal alternating voltages, now drops to near zero.

It remains to describe the manner by which the Reader circuit which is essentially identical to the card circuit in FIG. 1, synchronizes its counter with that of the card (and vice versa).

It is already understood that the terminal and the data card (travel pass) send out a data bit only in the counter period 'b'. It is now assumed that the receiving party's counter circuit is at that moment not in the 'b' period but in the 'c' period of its triple cycle. A high data bit received in FIG. 1 will cause, as explained, the bistable II to go high, virtually at the beginning of time section 'b' in the sending circuit but arrives, according to the present assumption in time period 'c' of the counter in FIG. 1. What happens is simply this: $\theta$ Of the bistable II, having previously been high goes low, applies a low-going pulse to capacitor C2 and thus does the same to the setting input of counter bistable IV as well as to the resetting input of the counter bistable III. This puts the counter immediately back into its time period 'b'. The same would happen if a data bit is sent to the READER circuit, and its counter were not synchronized; the very sending out of a data bit is therefore the synchronizing agent.

As FIG. 1$b$ shows, the circuit can also be used for charging a capacitor 'Co' via rectifier diodes d1 and d3. The charging of this capacitor Co as well as the current load imposed by the integrated circuit have the same effect as the sistor R1; these will cause a more or less gradual decline of the induced voltage. Accordingly, the resistor R1 may be omitted. Also resistors R2 and R4 should be made no lower than needed for operational stability. If the "Travel Pass" is powered by a battery (if the pass comprises a display, a battery will have to be included in any case) and the differentiator resistors are omitted, the signal form applied to gate Gα will be virtually the same as the input signal. Even in that extreme case, the circuit of FIG. 1 will function precisely as described.

As the "Travel Pass" transaction card is intended to be handheld during a data transfer it is important that any stray field emanating from the hand do not affect the data integrity through distortion or one-sided superimposition of static potentials.

A method for making common mode signals harmless is to apply to both the α and the β channel identical input signals but of opposite polarity, and, at the receiving side apply them to a differential amplifier dA. This is shown in FIG. 5. Since in this version both the input channels (α, β) are used for the data input, the clock signals must somehow be derived from the data stream itself. This is performed in the CLOCK PULSE EMULATOR circuit which uses a digital phase-locked Loop. FIG. 5 indicates this circuit group as a functional block.

The card 3 contains embedded i it not merely the active metal plates 4α and 4β but also a shield plate 3a. A purpose of this plate is to ensure that the static potential induced in it from external sources is equal at all points and will thus elevate or reduce the potential of the aforementioned active metal plates by the same amount.

In the lower part of FIG. 5 the remaining component elements of a "Travel Pass" are shown, namely the Liquid Crystal Data Display, the group of Data Entry Keys, and the Micro-Computer Chip which contains not merely the processor but also the various data registers and memory banks. The main input and output ports of the microcomputer are also indicated which link with those of the interface circuit above. The just described circuit is reckoned to be capable of transferring data at a rate only one third of the injected carrier. Using another interface circuit described below, only much lower data transfer speeds can be achieved.

As FIG. 6 shows, the card (3) contains again two metallic layers 4α and 4β These layers may be either be a thin metallic deposit or may have the form of a spiral coil. In the second case, the arrangement of the circuit would follow the indications of FIG. 4. Using a high rate of change induces field changes in the immediate surroundings of the capacitor plates, (or of the two spiral coils 4α and 4β) sufficient to produce the operating voltages and currents in the IC circuit of the card. In this present design, however, the periodicity in channel α and channel β is the same but opposite in phase. That means with increasing distance from the signal source (the Reader-emitter), the field forces nearly cancel each other and would thus have no effect on the card receiver antennas at read—card distances of more than a few inches.

When the operating voltage in the card has risen to an adequate level, its micro-computer 7 is programmed to produce an output at PAo or chip 7 (FIG. 6) with the clock pulse applied to it. This is applied to A N D gate 5 in FIG. 6 whose high output pulse makes the transistor 8 conductive, thereby producing a short pulse α-3 in the Reader Circuit. This pulse serves as a start signal for the Reader computer unit to commence its program of data interchange.

Figure 9:
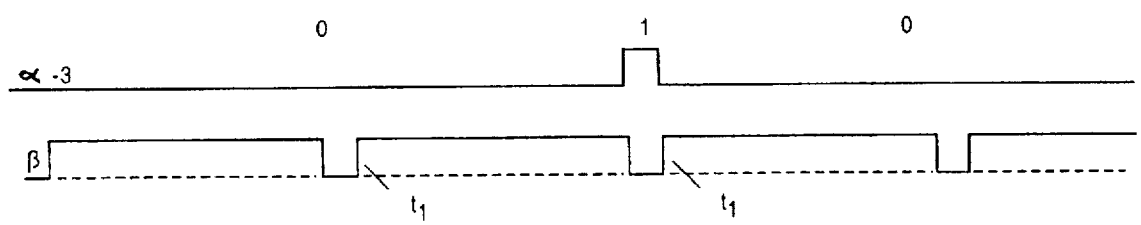

FIG. 8 shows the envelope of the waves for the data sequence 0-1-0. FIG. 9 shows a data bit at the output of the differential amplifier 6 in the Reader Unit, demonstrating the principle of data flow from CARD TO READER.

Also for this second version of a proximity data transfer, the principle of a fully balanced twin-input can be realized as for the preceding example in FIG. 5. Again, the clock pulse channel must be replaced by an inverted second data input channel while the still needed clock pulses are to be derived from the data stream itself. This is facilitated by converting the binary code into the well-known Manchester Code from which the clock pulses can be derived.

A "Travel Pass" to be universally useable, ought to be able to be used also for the automatic paying of parking fees and road pricing fees.

It would indeed be possible to use the 'travel pass' to these ends; if applied to the metering of road useage, however, the delays due to cards having to stop at entry and exit ramps may lead to the build-up of queues. Moreover, at exit ramps such delays could be dangerous because they may cause blockage of the neighboring fast freeway lane. It would therefore be desireable for electronic check points to read a 'travel pass' at a distance. —Financial transactions at a vending machine or market require the very opposite working conditions: Cards should be readable only at close proximity and reject all signals that derive from any distance beyond a few inches. It would therefore seem that a 'travel pass' could never satisfy the above contradicting requirements. However, this need not be necessarily so if one envisages the use of (electronic) change-over switches integrated and incorporated into the card circuitry. It would then be possible to enter logic commands via the data entry areas on the 'travel pass' to operate said change-over switches.

With the aid of FIGS. 10 to 14, the possibilities that derive from switched sensors, will 1 be explained.

FIG. 10 shows coils 1 and 2, and capacitors 3 and 4, as isolated components connected only to change-over switch elements 5,6,7 and 8.

FIG. 11 shows two oscillator circuits operating independently from each other whereas in FIG. 12 the two systems operate as a single resonance circuit. The resonance frequency in the two cases need not be the same. In FIG. 13, the two resonance systems deployed on the same card substrate work in, one switch position in counterphase, in the other switch position in phase. It is also possible to embed the coil conductors as very fine lines into a silicon substrate, with very accurately dimensioned spacing between the coil windings. The inter-wire capacity together with the inductance acts as an oscillator circuit. The switches 26,27 and 28 can be used for changing the relative phasing of the two systems. When the flux is as if from a source (23), it is a sink-flux (24) in the other coil, and vice versa. If the switch is changed over, the two coils have uniform flux changes. The changeover switches may also affect additional capacitive elements if a change of frequency is desired.

Those two factors, phase change and frequency change, will permit good separation of the two operational versions, the close proximity one and the moderate distance one.

It has already been mentioned that the switches can be provided in solid state form. In the execution of FIG. 14 the card comprises two silicon chips, one for the microprocessor and memory, the other for the switch logic. The surrounding area in both chips is used for the placement of the inductive coils 21, and 22 respectively. Manual switches (A,B) arranged on the card cause the microprocessor to generate control signals (1,r) dependent on whether the user intends to make a P O S transaction or a Parking or Road Pricing Transaction. Pinsize LEDs (AA, BB) would indicate at all times which mode is in operation.

The switch logic may be combined with the Microcomputer Chip on the same substrate. In that case, the I.C. may be placed between the two coil areas.

So far, this paper discussed the important aspects of signal exchange between a 'travel pass' and a Reader Unit. Next, a programming feature to be incorporated in the 'travel pass' is to be described, supported by FIGS. 15 and 16 which are event flow diagrams.

The program principles to be discussed relate to the general area of Payment of Fares by a card system, especially at the critical moments when a fare is due but the residual value of the card proves to be insufficient. The principle explained will be particularly useful for revenue collection on buses, but would also be very useful in other small payment situations.

It has long been known that cards can be used as a voucher of credit issued by financially stable institutions (such as Banks or Building Societies). Although the credit issuing company, debits the buyer or the seller, or both, in return for pledging payment, with a certain percentage of the moneys advanced, the procedure often includes a review of the card owner's accounts to see whether credit worthiness still exists. Sometimes it is necessary to transmit the numbers of blacklisted cards directly into a register close to the point of transaction. An example for how this can be done and how credit cards can be tested as to their validity, is given in U.K. Patent 2 092 344.

Assuming that equipment of this type is available on a bus, there exists also another technical difficulty affecting the cost efficiency of credit card debiting on public transportation in an urban area: it is the sheer number of transactions that occur. The average value for each such transaction is low, say about Pd. St. 1.20, yet for each such transaction sufficient data have to be transmitted to the Bank Computer of the Customer's bank to obtain payment. It can easily be seen that the normal routine for credit card payments such as come in, play with the purchase of capital goods, is not applicable lest the overheads would become too large.

Faced with this inapplicability of prior art of credit card payment to fare collection the present invention provides for measures and card processing software which intend to make its use in travel available for both the daily commuters, occasional travellers, in short for a substantial majority of the travelling public.

This aim is proposed to be achieved by combining the afore-mentioned electronic register for blacklisted numbers, with an accumulator of fares; the same would cause the latest fare to be added to the sum of preceding fares derived from the travel pass, and then updates said sum in the card memory. Every time the traveller's card is presented to a transaction terminal it reads from the card the sum of earlier fares, adds the current fare, and then compares the new sum with a preset number in a separate register of the transaction unit. This last-mentioned register is non-volatile and represents a reference level with which the value level of accumulated paid fare memorized in the "travel pass" plus the fare that would be payable for the current trip is compared. For the purpose of explaining the idea, it should be assumed that the comparison shows that the sum of all fares exceeds the reference value level. This condition triggers another program set in the transaction programming unit which (a) deducts from the reference value the amount by which the sum of all fares exceeds this value (b) the then remaining value is entered as a refreshment update into the value register of the "travel pass".

(c) the account number of the travel pass, together with the bank code and interbank fund transfer phone nr. are being read out from the travel pass and transfered to a Register in the Transaction Unit.

Throughout the entire regional transportation system the above cited reference value is the same, in other words, all travel passes are at all times updated by a constant value, in some cases by a multiple of that constant value. This arrangement does not only permit the process to be automated, but also reduces the quantity of data that have to be processed, both by the transport operator's computer plant and by the various banks who participate in the project. From the ordinary traveller's point of view this scheme has the advantage that he/she need not worry about fares exceeding the balance in the travel pass which, in other circumstances, may mean interrupting the journey and trying to find a branch of a suitable bank for updating the pass, or a person has to carry enough cash to have the pass updated by the bus driver or the local ticket office, etc. If the travel pass requires updating during a high peak hour, or at a moment when a train has to be boarded, this can be highly inconvenient. Some bus drivers may refuse to do any updating during rush hours. It would be an all around inconvenience to all concerned and reduce the efficiency of the transport system. —The new method would in practice mean that on an average 10 times fewer data transmissions need be carried out each day; the cost of the credit system would go down to acceptable levels. Also: Transport companies will receive easily auditable bulk payment for their services to the public made directly by banks to their corporate bank accounts, bye-passing all paperwork and the handling of coins and bank notes, chques, and vouchers. The considerable overheads implicit in fare collection today, can be reduced. —In addition, the very drastic reduction of boarding times would reduce turnround times which amounts to a better service to the public.

The feasibility of the envisaged performance can best be understood with reference to FIG. 15 in which the interactions between the "travel Pass" the transaction unit 1, a depot computer 14 and a central clearing computer 19 are represented by functional block diagrams. The card Reader consists of a plate containing a wire loop (or capacitive plates) 3, an optionally provided lamp 2, and interface circuit 5 for preparing signals for transfer to the card 20 as well as for receiving and adapting signals coming from the card for entry into the microprocessor 7. Between the units 7 and 5 may be provided a scrambling unit 6 which ensures that vital data, such as the systems protection numbers, cannot be deciphered by means of radio equipped clandestine analyzers. An example of such an encryption/decryption circuit has been given in the published patent GB 2 130, 412B. —The microprocessor 7 passes the serial number of the card 20 obtained via the Reader 3, to the circuit group 8 which contains the means for comparing the serial number with all the blacklisted numbers of the local traffic region. This is done at a high clock rate.

If any of the numbers contained in the blacklists of block 8 is equal to the serial number of a card being processed, the unit 8 emits a flag signal through its connector line 7-2 and causes the microprocessor 7 to change its prograph and produces a display on the driver's Console 12 or/and activates a buzzer or the like, and also extinguishes the lamp 2 (Lamp 2 may be used for illuminating solar cells fitted on the "travel pass" card 20). The driver will request fare payment in cash, or request update of the card against cash.

Assuming the card is not blacklisted, the next step would be to assess its genuity. This is done by a procedure described in GB 2,092,344, a published patent. The procedure is recapitulated in the flow diagram FIG. 16. Returning to FIG. 15, the scramble unit 6 and the register 10 are assumed to be contained on the same silicon chip together with the processor circuit 7 so that no external connection line is required to carry the secret protection number in clear form. This is essential for the preservation of secrecy.

Block 9 is important for our purposes in the present invention. It is a register holding the number which represents a value level to be compared with the accumulated fares since the last update of the card. If there is an excess of fares debt over and above the said reference number in block 9, a program in the microprocessor is started which (a) deducts from the accumulated fares debt the fixed number in register 9

(b) enters into the register 11 the card serial number of the card 20

No further additional data need be entered into register 11 in support of the serial number since the very fact of a recording of the serial number in register 11 is equivalent to a constant debit as prescribed by unit 9. This level, as already indicated, is the same throughout a given transport region, and would also be agreed with the banks in that region.

When the bus arrives at the Depot 14 at the end of the day's shifts, the bus personnel establishes a connection between the transaction unit 1 and the depot computer 14 which then controls the transfer of all the serial numbers of cards which underwent the described update procedure. The data transfer is preferably done via an optical cable link 15-8. On this occasion, the most recent compilation of blacklisted serial numbers are entered by the Depot Computer into the on-vehicle register block 8.

Between the late hours of the day and the early morning hours of the next day, the Depot Computer translates, —based on prepared look-up tables —,the serial numbers received from Register 11 of the transaction units of buses into the appropriate account numbers which are then sorted by Bank Codes and branch numbers, enabling a Computer to transmit the list of units debts to the various Head Office Computers of the participating banks. While thus the individual accounts of various transport patrons are being debited with the said units charges in favor of the Banks concerned, each Bank will arrange to send to the various Transport Depot Computers 14, 14', 14" ... etc the amounts due to the various fleet owners. This last-mentioned step can be omitted, if the various vehicle operators opened bank accounts with the major banks of region. There by, further savings can be achieved.

FIG. 16 shows a flow diagram for the sequencing of the just described processing steps in cases where fares are always straight flat fares pre-payable at the entry of a vehicle or a station platform.

FIG. 17 is a flow diagram for graduated fares. Section 'A' in this flow diagram is identical with that shown in FIG. 16, and is therefore not shown. The diagram also illustrates the differences for railways and buses.

The processing of graduated fares on public transport systems is within the public domain ( see UK patent 857,658) and need therefore not be described here. That early publication prescribes the use of magnetically encoded cards whereas the present paper relates to electronically encodable data components endowed with processing capability within the cards. Compared with the apparatus of the old technique, electronic Readers are very small and can be clamped to a support rail or side wall and therefore need much less space which in buses is at a premium. Passengers need not enter the card into machine. The technique used in a "travel pass" is such that the traveller has to hold the pass briefly against the 'Reader' plate. While the new data transfer technology employed in 'travel passes' (see UK patent application 9 115 408.8) makes possible the mounting of Readers close to entrance and exit doors of buses, there is still doubt whether the same technique can efficiently be combined with turnstiles.

One way for dealing with the problem of graduated fares on buses would be to charge the passenger when he boards the bus, for the entire remaining route of the bus, but, when the passenger checks out at the exit door, he is refunded the excess of the paid fare over the proper fare to the point of exit. However, this method does not exclude that a passenger may choose to check out his/her pass ahead of time, long before he actually leaves the bus.

It is therefore proposed that the following alternative procedure is used on long-distance bus routes: The passenger pays upon entry the fare for the whole distance until the end of the line. No equipment is provided for checking out at any of the exit doors of the bus. Instead, all the stops along the route are fitted with so called "REFUND UNITS" where passengers, after left the bus vehicle, can obtain refund for any excess fare they paid when boarding the bus. —The electronics of these 'refund units' would be fully protected by the systems check numbers and the scrambled communication system as described in GB 2057740 and GB2092344.

In this context, a fully automatic fare collection procedure for long-distance bus lines can be effectively realized without any possibility for fraudulent misuse on the vehicles.

Having described the "travel pass" in some detail with respect to its inventive techniques for communicating with a read-write unit, as well as some of its inventive features in its data processing programs, the further description of the travel pass will now reveal the innovative structures, electrical and mechanical; reference will now be made to FIGS. 18,19,25 to 28.

FIG. 18 illustrates the basic electrical building blocks of a travel pass (at times also called "smart purse"). There is a micro computer 1, a push button aggregate 2 and a display window 3 with its drive circuit 4, a battery 9 and a voltage stabilizer circuit 5 to produce the operating voltage for the microcomputer within the required tolerances, and an antenna 7 cooperating with an interface circuit 6. The latter may also comprise a scrambling/descrambling and security circuit 6a as for example described in full detail in GB patent 2,130,412. In place of AN ELECTRO-MAGNETIC RADIATION ELEMENT 7 also optical devices may be used for producing the field disturbances interpretable as data. Equally, plain capacitive coupling elements such as described in the UK patent application serial nr. 9115403.9 and applic. nr. 9122242 may be used.

FIG. 19 shows the top part of the data carrier 10 with numerical data entry buttons 2a, and functional command buttons 2b, and a special sideways mounted button 2c (for use by the thumb of the right hand holding the device in front of the reader surface). A Display Window using liquid crystal techniques 3 provides feedback to the user. Two holes 11 permit the device to be suspended in a vehicle permitting data to be read while the vehicle is in motion.

FIG. 19a shows a possibility of rear illuminating the LCD display during or after a transaction. See also FIG. 24). The LCD glass plates are sandwiched between two parts, 10a and 10b, of the purse device. Part of the rear surface 10d may be used for electricity generating photosensitive layers. A capacitive antenna plate 10p may be embedded in the plate 10a to function as a data transducer (see above cited patent application Ser. No. 9,122,242).

The data component illustrated in FIG. 25 employees electronics as shown in FIG. 18 but offers more diversified facilities than the component of FIG. 19.

A larger readout window 3 permits alpha-numeric information in both small and large lettering. Apart from the numbered manual data entry buttons (0–9) there are elongated data entry buttons such as button 15 (marked En), a double arrow button for moving a cursor on the display screen to a desired position. Another square button 2d (marked U) is provided by which the numbers 0–9 are lifted into an upper case, as it were, thereby acquiring a different meaning (see Table I, FIG. 26). By pushing button 2d once, the number "1" acquires the meaning of a purchase code for purchasing stationeries. The user is aware that he has pressed button U because of the visual indication provided by the three pin-sin LED lamps 19 The lowest one stands for the Lower Case, the middle one for the upper Case, and the third one for the "double upper case" level.

The third level is obtained when the button "U" is pressed twice. The three levels rotate with recurring push on button 'U'. Also display window indicators may be used to the same end.

The horizontally arranged buttons I, II, III, and IV cannot be accessed without prior entry of a personal identifying number to give access to the respective memory sections containing credited sums of purchasing power. If the user wishes to get a visual display of the residual credit present in one of the credit accounts I to IV, he may have to precede this by number, for example the number '9'. If, then, immediately after entering the PIN the number 9+III is entered (which appears on the display window to assure correct entry) and thereafter the button En is pressed, the residual credit amount will become visible, based on the appropriate programming of the micro computer chip 1.

There are, furthermore, buttons marked alpha, beta and gamma, which, combined with number '9' produce a readout of the summed discounts resulting from purchases with Discount Stores alpha, or respectively beta, or gamma. These sums may normally not be useable for general payments but only for purchases in the same stores who have offered the discounts. However, some stores may in fact offer discounts which do not need entry of a special code by the Discount Store's own terminal but may be used for executing a payment at any terminal. This latter arrangement can best be implemented by arrangement with the Store's Bank, and would be handled like credits from Banks I, II, III etc., in other words, the user may draw from an Alpha Store by transferring an amount to the so called "money store" (see U.S. Pat. No. 4,859,837).

According to the cited system, payments can be made from the money store without requiring prior entry of the PIN number. (The owner's personal secret number).

The keyboard shown in FIG. 25 offers many more ways for personal financial management. The following examples can be considered directives for programming the "travel pass" and are part of this invention.

(a) The combination of a double upper case level; 2x (U), with another of the ALPHA, BETA, OR GAMMA buttons produces on the screen window the last expenditure made. Upon pressing the button (say, ALPHA) again, the last-butone expenditure is displayed; after pressing ALPHA again, the expenditure of the preceding purchase appears. The user may continue along this line and review the successive expenditures stored in the processor stack, and may write them down in his or her note book. He may get the same result when selecting BETA but with the difference that any expenditure item displayed is deleted at the moment the next-earlier expenditure is selected. This way the stack is cleared in preparation for the next day's (or week's) expenditures.

Each stack row would display the following data: Date of purchase, amount, classification code, and the account used for the purchase ( i.e. I, II, III, or IV) .

(b) Another way of clearing the stack when the display indicates that it is full is to enter a sorting command. The card processor will then be directed to sum expenditures having the same classification code, and add the sum to the amount (if any) present at the same storage address containing already an amount constituting earlier summed expenditures of the same classification code. (See TABLE I, FIG. 26). This procedure is repeated for all the ten classification codes. After that is done by the control circuit of the purse the stack is cleared of all its data.

The above mentioned 'sorting command' might be entered by means of selecting a number other than 9 plus the upper case button (11). If such a command is not issued when the stack is full, the earliest purchase record at the bottom of the stack would be lost at the next purchase transaction which would be entered at the top of the stack.

(c) Still another method for dealing with the stack data is to make its memory large enough for say 63, or even 127 purchases but permit no further purchase transaction if the stack is full. The user must then preset his/her purse for UPDATING. That means, the purse must be connected with a Bank computer of the owner's choice (if he has more than one credit account).

On this occasion, a printout is produced for all purchases contained in the enlarged stack by the bank equipment, and delivered by the Bank to the user. After that, the entire stack is cleared by code signal from the bank; however, the first line of the stack is then used to receive from the Bank computer the date of the update, its bank code, and location code from where the update operation was done.

(d) One important automatic summation store, also managed by the "TRAVEL PASS" processor is a fee payable with each update operation. The fee here referred to is not a bank charge (which may also be levied) but will be a hire-purchase fee which is programmed to stop once the total amount has been paid.

Say, the "Travel Pass" costs fifty Pound Sterling. Most people will prefer to buy it through fifty installment payments of One Pound each payable every time an update operation is executed. When the summation store reaches fifty , further debits will cease. The banks receiving these amounts together with an appropriate coding flag, will pass on these sums to the manufacturer or to the agents licensed to sell the "travel pass" devices.

A similar principle may be applied to insurance contributions which may be payable to guard against the contingency of inadvertently loosing the "travel pass". The insurance premium payable with each update may be 10 pence, or may be a small percentage of the value turnover. The percentage, however may increase with each incidence of loss affecting the same individual.

PS. Electronic purses have no cash value to a finder except what he finds in the so called 'money store' the capacity of which would be kept small; even this quasi cash value may not be available to a finder of the purse or pass because of the 'automatic-return-to-credit function that a cautious user would always activate to become operative after a preselected time lapse (see further below). Most finders of a forgotten purse will therefore hand in the device to the nearest bank knowing that a reward will be payable to the finder after contact has been made with the owner to ascertain the circumstances.

(e) When a transfer is made from a selected credit account (I, II, III, of a portion of the residual credit to the so called "money compartment" this invention provides for a time lapse command which the user may enter, ordering the purse processor after the expiry of the preset time lapse to return the residual amount in the 'money compartment' of the memory to the credit account section of the travel pass from which section it had been derived. This command does not require a special command code if the entry of the time lapse is made immediately after the transfer of a sum from a credit account to the 'money store'. Fee Flow Diagram FIG. 27.

From the example given in the Flow Diagram, the user wants the next payment to be made from credit transferred from his Account IV. The PIN had already been used for obtaining the display of the contents of the money store. It has therefore not to be repeated for obtaining the display of the contents of credit store IV, namely 238.20 (in whatever currency).

The user enters 125.00 units for transfer to the "money store" After that, considering that the shopping trip will be finished in half an hour, the user enters 40 (minutes), then presses En for enactment. This will ensure that the money account will become empty after 40 minutes whether anything was purchased or not.

(f) In order to prepare a purse or pass for an UPDATE, a PIN must be entered correctly. This invention provides in its programming the possibility for two different PINs being used, namely one for all purchase and access transactions, and another for use only for update operations. Such a practice would still further increase the overall security for the account holders. After the PIN entry if successfully carried out, the user will select which of the accounts he wishes to update (I, II, III, IV). The display window will reflect the choice. This preparation also acts as an address selection for the purse sending out a dial signal over the telephone system to reach the respective Bank Computer Center. This signal can only be sent out via field disturbances representing data if the 'purse' or 'pass' is presented to an appropriate Reader Unit.

There would be, according to this invention, two foremost locations where UPDATE TERMINALS are installed. Firstly, in the banks which participate in the "travel pass" scheme. Secondly, for remote fund transfer, there would be terminal units connected to the telephone network. Such units can be connected via the standard telephone switching system to the Bank Computer as "dialled" by the "travel Pass". Long-distance and international Codes, however, must be dialled by the user himself before inserting the Pass or Purse into the proximity-coupled data transfer transducer of the phone network terminal. Once the Pass establishes data contact with the Bank Computer concerned, a data dialogue is initiated stridly controlled by protocoll during which various security check data are called up by the Pass (including date and time of the last update which remain stored in the Pass) and if these data are in agreement with bank record the depleted credit level in the Travel Pass is brought up to the level as arranged with the branch manager. The end of the transcation is indicated by a buzzing tone or the like, the user removes the Pass from the terminal.

(g) The Travel Pass may also be used for storing different telephone numbers. Access to the selected telephone number is by viewing it on the display window of the Travel Pass after entering a first or second shift level (using button 'U') combined with an easily remembered double digit number. travel pass readers may be built (both home phones and pay phones). When the travel pass is placed on the reader surface of such a telephone, the Travel Pass will pass on its instructions and the full dial number held in memory, responsive to the selected two digit number.

(h) One of the advantages of a financial data carrier equipped with data entry buttons is that the P I N, the secret personal identifying number, can be changed by its owner without reference to a central computer, and that such a change can be enacted virtually as soon as there is any suspicion that someone may have acquired knowledge of the code ( see flow chart FIG. 27).

As a part of this invention, it is also proposed that a programming option is foreseen which would permit the owner of a purse to allow a friend or relative to know one of two Pin numbers, but not the other. The owner, however, would use the other PIN. The owner can also use the second PIN for changing the first PIN whereas the first PIN cannot be used for changing any of the PINs. This provision can be achieved by appropriate hardware and software design.

Another feature according to the invention is the provision that the user may, if under duress to disclose any of the secret access numbers, use them or have them used by a third party but request an additional digit entry as part of the code which, if operated in a credit transfer with a bank, would cause an alarm to sound and also give the location of the pay phone terminal, from which the UPDATE or Transfer attempt is made. This is intended to enable law enforcement officers to appear on the scene quickly.

The conventional smart card as a data base for the smart purse.

At this point the description of a smart purse or travel pass can be considered complete: it projects a card with fundamentally novel methods of data transfer, with due consideration to the diametrically opposite needs for strictly proximity transactions and where distances of several feet may have to be bridged. Where cards can remain handheld before, during and after a transaction. Where the programming takes account of the practical needs in public transport and other systems. And wherein the physical structure has been fairly narrowly defined.

However, there remains the problem of transition. The market is swamped with contact smart cards which require Readers of a kind quite different from those described in this paper. If mass transport consultants recommended non-contact Readers for transport applications, there would be no role for the contact smart cards in this area of application. The purpose of the final section of this paper is to show that contact smart cards can be a useful database for the versatile and fast-working "Travel Passes".

The electrical connections for this combination are shown in FIG. 20. It is possible to connect the serial output $PA_o$ of the microcomputer 1 with the I/O point of the card 8 because these are tri-state output/inputs and since there is a common clock CLK and a common program sequence, these states of these interface points can be programmed not to conflict with each other.

For purely internal readout operations and number transfers between storage sections, the clock pulses are derived from an oscillator in the interface section 6. However, when communicating with a terminal, the clock pulse frequency is under the control of the terminal input. The circuit group 6 converts signals received by the antenna 7 for the field disturbance interpretable as data into logic levels binary signals. An example for this interface circuit is given in the co-pending patent applications Ser. No. 9,115,403 or GB 1,314, 021 or GB 2 075 732 B. Other examples are the F/2F binary data coding; the phase modulation of a carrier wave;

frequency shift keying; and the use of infra-red receptors and transmitters. A battery 9 must be powerful enough to cover the current requirement of both the purse device and of the inserted smart card 8. The battery may be of the rechargeable; type so that solar cells such as may be mounted on the purse exterior may continually recharge the battery. The circuit group 5 is a 3% tolerant voltage stabilizer.

FIG. 21 illustrates one version for applying a card to the purse device 10. At one end, a flat spring 13 is mounted to which is attached a pressure pad. (not seen). The same penetrates the shell 10 and partly blocks the internal slot area (12) so that a card cannot be introduced except by lifting the said flat spring 13 slightly. When the card is fully introduced, the spring blade 13 is released so that the same holds the card in position and the card can now be read by the purse electronics via the contact pad 14.

Another way of putting a smart card into a functional relationship with the smart purse is shown in FIGS. 22, 23, 24. The rear of the main frame 10 is covered by a metal lid 20 hinged at the upper end on an axle 22 held by flanges 10f. The lower edge 20a bears during the closing action against the thickened end 21a of a springy metal angle 21. With additional pressure, the latter gives way and the lid can be snap-closed.

To insert a card 8, the lid 20 is opened; the card inserted as shown; and the lid 20 fully closed again. An elastic pressure pad on the inside of the lid holds the card against the flat surface 10k. To improve the manual grip of the hand on the lid 20 when opening it, the main body 10 is slightly recessed on both sides on the middle area of the device; these recessed portions are marked 10g. Alternative means may achieve the same end.

Contact with the metal pad 14 of the card 8 is made by platin-tipped, spring loaded pointed pins 23 as shown in FIG. 24 about four times enlarged. The tiny coil spring 24 as shown in FIG. 24 is also used as a wire 24a to establish continuity between the corresponding segment of the card contact pad 14 and the card electronics. The tiny coil spring 24 and the contractor pin 23 are retained in the hole of the central main plate 10h by a bottom plate 10i and a top plate 10k. Tolerances must be close to avoid any dirt to enter the pin hole. The precision hole drilled in the cover plate 10k will ensure good moving fit for the contact pins 23.

The lid 20 may be used as a capacitive antenna for sending and receiving data to and from a "travel pass" communication terminal or 'reader' unit. Any of the techniques discussed in the first part of this paper may be employed.

The hybrid solution here presented for using simultaneously a contact smart card and an electronic purse (i.e. travel pass) could be usefully employed by persons who have several smart credit cards each holding credit from a different bank or building society etc. The versatility and convenience of a handheld payment instrument such as the travel pass could thus be made available to other card technology.

Figure 3A:
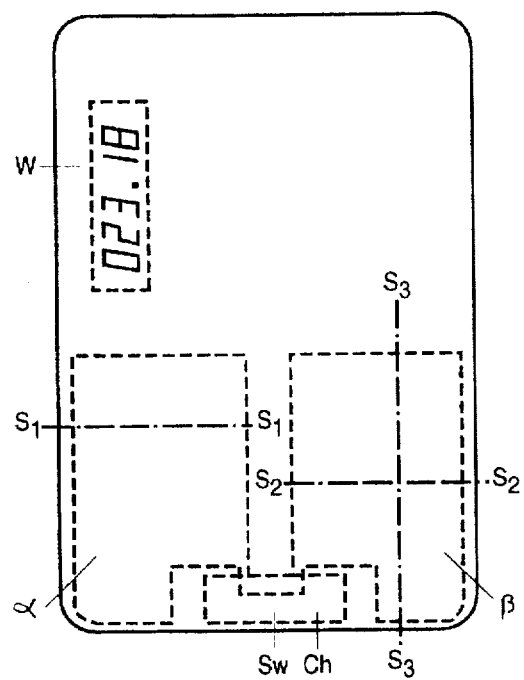
FIGS. 3a, 3b and 3c are details of FIG. 3.
Figure 3B:
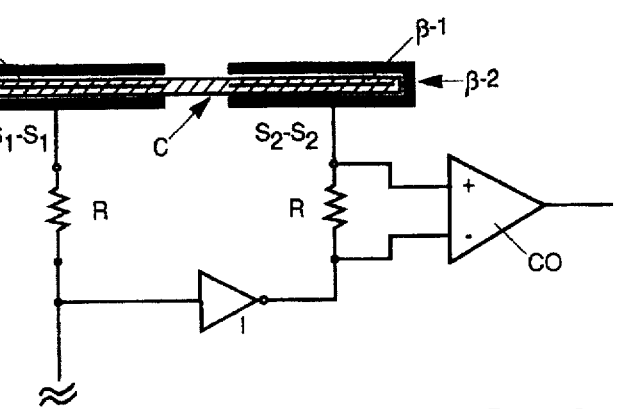
Figure 3C:
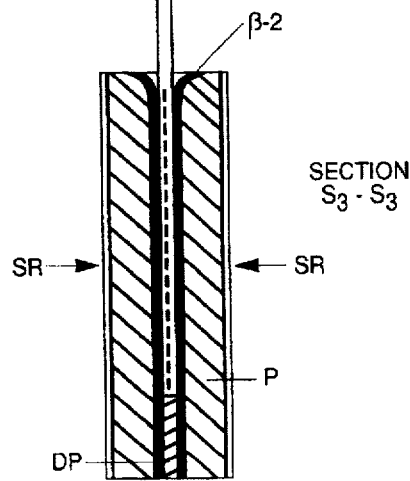

FIG. 3C shows an interface terminal with capacitive coupling for use with a thin memory card or smart card. The card C is inserted into a slot made of plastic material P internally lined with two metallic layers insulated from one another except that they are both connected to input bonds of the LSI chip CH. Each of said layers encompasses the slot gap on both sides forming a kind of Faraday cage into which the card is dipped. The drawing FIG. 3A shows these layers ($\alpha$-2, and $\beta$-2) in cross section. The internal width would be only marginally wider than the thickest card or travel pass to be employed with that type of Reader terminal.

The card itself may be thought of being made of three sandwiched layers two outer and a middle layer, the latter being cut away to make room for the LSI Chip. The same is a microcomputer with only two connector bonds, for connecting to the two transducer elements (capacitive plates or inductive coils). The same chip may also accommodate the extra logic for the scrambling/decrambling of the incoming/outgoing signals and for any extra switching functions which the proper performance of the described systems requires. W is an optional LCD window.

An advantage of the described configuration of the capacitive lining on a slotted Reader unit is that a good coupling factor is obtained with the prospect of injecting enough power into the card or travel pass for powering the LSI circuit CH as well as the liquid crystal display showing the latest balance held in the pass, retaining it legible for up to one minute after a transaction. —Inexpensive, non-processing Read-Only readers can also be provided as a complement to the overall system where the public may obtain a quick status readout without having to occupy the time of a transaction device.

Figure 3D:
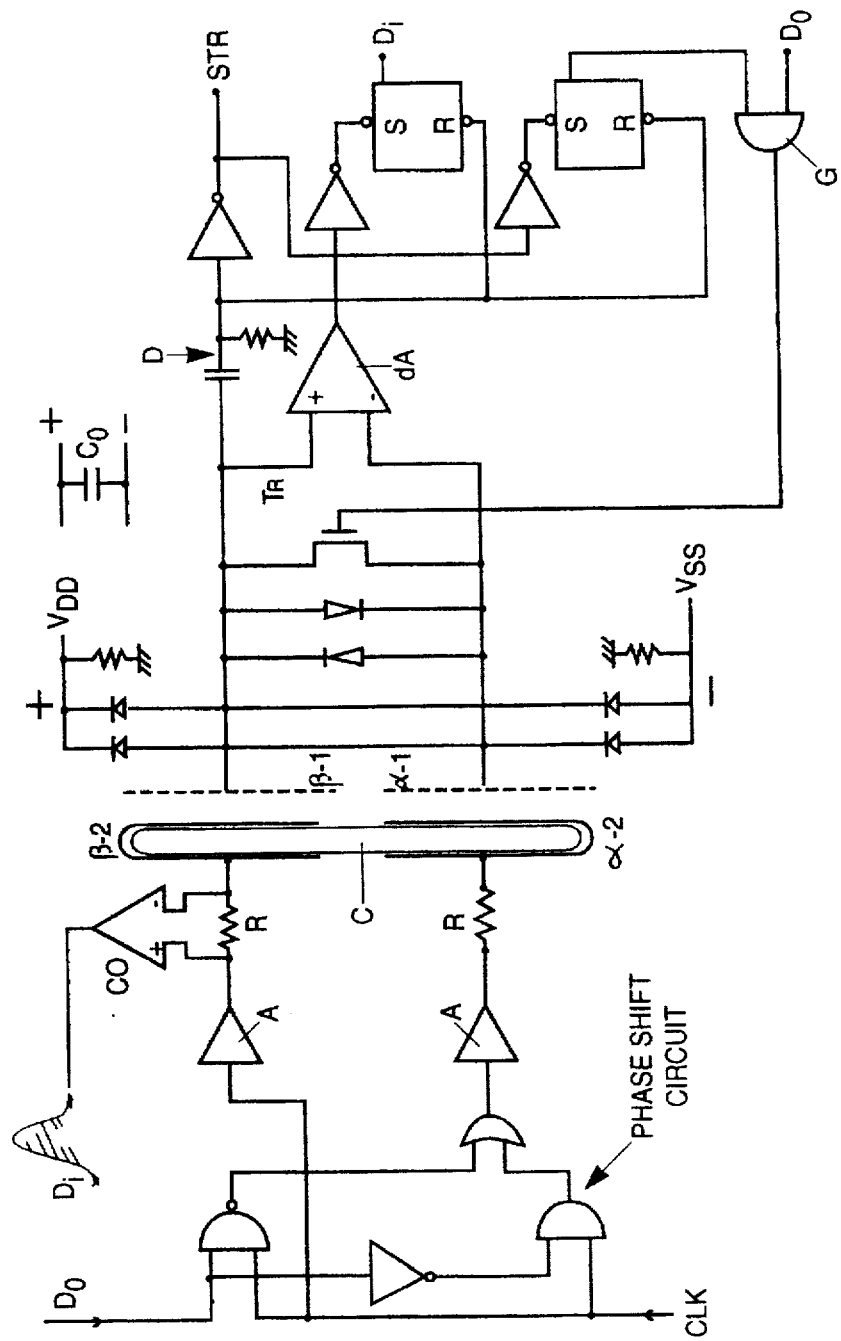
FIG. 3d is a modified form of data transfer circuitry of FIGS. 3a, 3b and 3c.

FIG. 3d provides an indication of the data transfer circuitry in the card of FIG. 3B.

The card C is again shown partly surrounded by the transfer elements ($\alpha$-2) and ($\beta$-2). They are connected to voltage amplifiers A via resistors R, driven by logic level square pulses CLK. If there are no outgoing data pulses Do from the Reader unit, the pair of capacitive plates are charged and discharged by a train of high frequency pulses of same shape, phase, frequency and amplitude. These electrical conditions will, mirrored by similar voltage changes in the card transfer elements ($\alpha$-1) and ($\beta$-1) within the card. The rectifier diodes cause a build-up of positive and negative potential on the operating rails of the chip circuit. This causes a brief transitional charging period, sensed by the Reader circuit by means of the comparator CO across the resistor R. The simultaneous rise and fall of the input potential ( -1, -2) on both input terminals of the Comparator dA will not cause any adequate output from this comparator circuit. —The differentiator D generates a strobing clock pulse for any high level applied to output terminal Di so as to clock serial data into a buffer register provided in the Microcomputer circuit of the chip CH (FIG. 3B). When said buffer register outputs a high level data bit it is applied to AND gate G which is enabled only during a high-going data bit by means of a simple S/R bistable. The output therefrom is applied to the gate of a field effect transistor TR whereupon the plates $\alpha$-1 and $\beta$-1 are short circuited for the duration of a single clock pulse. In the Reader circuit, this causes a voltage drop across resistor R and an output wave Di from the comparator circuit CO. —The logic circuitry on the left is needed to change the input $\alpha$-2 in such a manner that the differential amplifier dA in the card circuit produces a data bit output (Di) for every data bit output (Do) on the Reader side.

I claim:

1. Apparatus for transferring data from one device to another, comprising:

a portable device, a device that is relatively stationary as compared to said portable device, and data transfer means for transferring data from said stationary device to said portable device, and from said portable device to said stationary device, comprising means for transmitting data in binary form via said data transfer means from either one of said devices to the other of said devices, by producing a series of pulses and at predetermined times during said series providing, or not providing, a pulse, each said device having a counter for determining said predetermined times, and means responsive to at least one pulse of said series for synchronizing the counters.

2. Apparatus as defined in claim 1 in which said data transfer device comprises (a) a first plate on the portable device and a second plate on said stationary device, said plates cooperating with each other to form a path for signals to flow from one of said devices to the other of said devices when said plates are brought in proximity to each other, and (b) a third plate on the portable device and a fourth plate on the stationary device, with said third and fourth plates cooperating with each other to form a path for signals to flow from one of said devices to the other of said devices when said third and fourth plates are brought into proximity with each other, said data transfer means including means for transferring said data between said devices through at least some of said plates.

3. Apparatus as defined in claim 1 in which said data transfer device comprises (a) a first coil on said portable device and a second coil on said stationary device, with said coils cooperating with each other to feed signals from one of said devices to the other when said coils are brought into proximity with each other, and (b) a third coil on the portable device and a fourth coil on the stationary device, with said third and fourth coils cooperating with each other to feed signals from one of said devices to the other when said third and fourth coils are brought into proximity with each other.

4. Apparatus as defined in claim 1 in which said data transfer device comprises:

a first component part on said stationary device and a second component part on said portable device, said parts, when in proximity to each other, forming a means for the transfer of signals from one of said devices to the other one of said devices, a third component part on said stationary device and a fourth component part on said portable device, said third and fourth component parts, when in proximity to each other, forming a means for the transfer of signals from one of said devices to the other one of said devices.

5. Apparatus as defined in claim 4 in which said component parts are capacitor plates.

6. Apparatus as defined in claim 4 in which each one of said component parts is a coil.

7. Apparatus as defined in claim 1, in which said data transfer means comprises at least one antenna on said relatively stationary device and at least one antenna on said portable device.

8. Apparatus as defined in claim 7, in which each of said devices has at least two antennas on it, the antennas on one of said devices comprising means for communicating with the antennas on the other device when the two devices are positioned in proximity to each other.

9. Apparatus as defined in claim 7, in which each of said antennas comprises a capacitor plate.

10. Apparatus as defined in claim 7, in which each of said antennas comprises a coil of conductive material.

11. Apparatus for transferring data from one device to another, comprising:

a portable device, a device that is relatively stationary as compared to said portable device, transfer means for transferring signals from said stationary device to said portable device, and from said portable device to said stationary device, when and only when said devices are positioned in proximity to each other, said transfer means comprising (a) a first means for transferring signals from one of said devices to the other of said devices, and (b) a second means for transferring signals from one of said devices to the other of said devices, and means associated with one of said devices for applying pulses to the said first means and to said second means, including means rendering the pulses fed to said first means out of phase with the pulses fed to said second means.

12. Apparatus as defined in claim 11 in which each of said first means and said second means has at least two parts, one of which parts is on one of said devices and the other of which parts is on the other one of said devices, said first means and said second means transferring signals from one of said devices to the other of said devices only when the said parts that are on said one device are in proximity to said parts that are on the other said device.

13. Apparatus as defined in claim 12 in which said applied pulses are substantially square wave pulses.

14. Apparatus as defined in claim 11 in which said means for rendering pulses out of phase comprises means for rendering the pulses fed to said first means about 180 degrees out of phase to the pulses fed to said second means.

15. Apparatus as defined in claim 14 in which said pulses are substantially square.

16. Apparatus as defined in claim 12 in which each of said first means and said second means comprises coils.

17. Apparatus as defined in claim 12 in which each of said first means and said second means comprises a condenser; each said condenser having two plates, one of which plates is on one of said devices and the other of which plates is on the other device.

18. Apparatus as defined in claim 12 in which said means for applying pulses comprises means for applying clock pulses.

19. Apparatus as defined in claim 18 in which said means for applying clock pulses comprises means for applying substantially square wave pulses.

20. Apparatus as defined in claim 19 in which said means for applying pulses comprises means for applying the pulses to said first means about 180 degrees out of phase with the pulses applied to the second means.

21. Apparatus as defined in claim 12 in which said means for applying pulses is a part of said stationary device.

22. Apparatus as defined in claim 12 in which said first means comprises two inductors, one of the two inductors being on one of said devices and the other one of the two inductors being on the other one of said devices.

23. Apparatus as defined in claim 12 in which said first means comprises a capacitor plate on one of said devices and a capacitor plate on the other one of said devices.

24. Apparatus as defined in claim 23 comprising a Faraday cage in operative relation to at least one of said plates.

25. Apparatus as defined in claim 12 in which each of said parts is an antenna.

26. Apparatus as defined in claim 25 in which each antenna is a plate.

27. Apparatus as defined in claim 25 in which each antenna is a coil.

28. Apparatus for transferring data from one device to another, comprising:

a portable device, a device that is relatively stationary as compared to said portable device, transfer means for transferring signals from said stationary device to said portable device, and from said portable device to said stationary device, said transfer means comprising (a) a first pair of conducting plates one of which is on one of said devices and the other of which is on the other of said devices, and (b) a second pair of plates one of said second pair of plates being on one of said devices and the other plate of the second pair being of the other of said devices, said pairs of plates constituting means for transferring signals from one of said devices to the other of said devices when each plate on one of said devices is in proximity to a plate on the other device, and Faraday cage means on at least one of the plates of at least one of said devices for enhancing transfer of signals between said devices.

29. Apparatus as defined in claim 28 in which a Faraday cage is on both of the plates of said one device.

30. Apparatus as defined in claim 1 in which said means for synchronizing the counters comprises means for automatically synchronizing the counters when a high bit is being transferred from one of said devices to the other device.

31. Apparatus for transferring data from one device to another, comprising:

a portable device, a device that is relatively stationary as compared to said portable device, data transfer means for transmitting data from said stationary device to said portable device, and from said portable device to said stationary device, comprising means for transmitting data in binary form via said data transfer means from either one of said devices to the other of said devices, including clock means for producing a series of groups of pulse positions and also including means for sending data during a predetermined one of said positions of each group and sending pulses during most of the remaining positions of said series.

32. Apparatus as defined in claim 28 in which said clock means produces three pulse positions in each of said groups.

33. Apparatus as defined in claim 32 in which said means for sending data sends data during the second pulse position of each said group.

34. Apparatus as defined in claim 33, including set and reset means for providing set and reset conditions, and means for providing a pulse at the third pulse position of one of said groups for changing the setting of said set and reset means.

* * * * *